(12) United States Patent
Ando et al.

(10) Patent No.: US 7,535,733 B2
(45) Date of Patent: May 19, 2009

(54) METHOD OF CONTROLLING DC-TO-DC CONVERTER WHEREBY SWITCHING CONTROL SEQUENCE APPLIED TO SWITCHING ELEMENTS SUPPRESSES VOLTAGE SURGES AT TIMINGS OF SWITCH-OFF OF SWITCHING ELEMENTS

(75) Inventors: Keiichi Ando, Anjo (JP); Shinya Goto, Gifu (JP); Koji Kawasaki, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 348 days.

(21) Appl. No.: 11/600,903

(22) Filed: Nov. 17, 2006

(65) Prior Publication Data

US 2007/0115697 A1 May 24, 2007

(30) Foreign Application Priority Data

Nov. 18, 2005 (JP) ............................. 2005-334309
Sep. 29, 2006 (JP) ............................. 2006-267370

(51) Int. Cl.
*H02M 3/335* (2006.01)
*G05F 1/00* (2006.01)
(52) U.S. Cl. ........................ 363/16; 323/282

(58) Field of Classification Search ................... 363/15, 363/16, 17, 21.04, 21.06, 41, 55, 131; 323/282
See application file for complete search history.

(56) References Cited

U.S. PATENT DOCUMENTS

| | | | | |
|---|---|---|---|---|
| 6,304,460 B1 * | 10/2001 | Cuk | ............................. | 363/16 |
| 6,388,896 B1 | 5/2002 | Cuk | ............................. | 363/16 |
| 6,462,962 B1 * | 10/2002 | Cuk | ............................. | 363/16 |
| 6,580,626 B2 * | 6/2003 | Takegami | .................... | 363/97 |
| 7,130,204 B2 * | 10/2006 | Tsuruya | .................... | 363/56.12 |
| 2003/0086282 A1 * | 5/2003 | Zeng et al. | .................... | 363/95 |

FOREIGN PATENT DOCUMENTS

JP   2000-184710   6/2000

* cited by examiner

*Primary Examiner*—Tung S Lau
*Assistant Examiner*—Yemane Mehari
(74) *Attorney, Agent, or Firm*—Nixon & Vanderhye PC

(57) ABSTRACT

In a DC-to-DC converter which can convert DC power supplied to a first voltage system circuit, having first and second switching elements, to DC power at a boosted voltage, produced from a second voltage system circuit having third and fourth switching elements, with conversion performed based on control of a switching sequence of the switching elements, the sequence is designed such that switch-off of each of the first and second switching elements occurs only when the current flowing in the switching element is close to zero, thereby suppressing occurrence of voltage surges at switch-off.

51 Claims, 18 Drawing Sheets

METHOD OF CONTROLLING DC-TO-DC CONVERTER WHEREBY SWITCHING CONTROL SEQUENCE APPLIED TO SWITCHING ELEMENTS SUPPRESSES VOLTAGE SURGES AT TIMINGS OF SWITCH-OFF OF SWITCHING ELEMENTS

CROSS-REFERENCE TO RELATED APPLICATIONS

This application is based on and incorporates herein by reference Japanese Patent Application No. 2005-334309 filed on Nov. 18, 2005 and Japanese Patent Application No. 2006-267370 filed on Sep. 29, 2006

BACKGROUND OF THE INVENTION

1. Field of Application

The present invention relates to a method of controlling a DC-to-DC converter.

2. Description of Related Art

Various types of isolated DC-to-DC converter are known, and widely utilized. For example, the DC-to-DC converter example shown in FIG. 1 is of such a type, having two switching elements Q1, Q2 at the input side and two switching elements Q3, Q4 at the output side, with each of the switching elements controlled for on/off switching in a predetermined sequence. Unless otherwise indicated, it will be assumed in the following that each switching element of a described DC-to-DC converter is a MOSFET, with switching controlled by altering the gate voltage.

FIG. 33 is a timing diagram showing an example of a prior art type of basic gate control sequence for controlling the switching elements Q1 to Q4 in the DC-to-DC converter of FIG. 1. As shown in FIG. 33, the switching elements Q1, Q3 and the switching elements Q2, Q4 operate in synchronism, with the switching elements Q1, Q2 performing complementary on/off switching, and the switching elements Q3, Q4 similarly performing complementary on/off switching. At each transition interval in which the switching elements Q1, Q2 change between the on/off (i.e., closed and open) states and each transition interval in which the switching elements Q3, Q4 change between the on/off states, respective dead times Td1, Td2 are provided. These are intervals in which both of the switching elements (i.e., both switching elements Q1, Q2, or both switching elements Q3, Q4) are in the OFF state.

Such a DC-to-DC converter can operate in a boost mode, for converting input electrical power supplied to the No. 1 voltage system circuit 100 to output power that is supplied to the No. 2 voltage system circuit 200 with the output voltage of the No. 2 voltage system circuit 200 being higher than the input voltage of the No. 1 voltage system circuit 100. In the boost mode, each time the input side switching element Q1 or switching element Q2 becomes turned off, the magnetic energy stored in the choke coil L causes a high level of voltage surge to be applied to the switching element that is switched off. If the DC-to-DC converter is operated in a step-down mode (i.e., back operation) in which electrical power is converted from being supplied to the No. 2 voltage system circuit 200 to being supplied to the No. 1 voltage system circuit 100, with the input voltage of the No. 2 voltage system circuit 200 being higher than the output voltage of the No. 1 voltage system circuit 100, and if the switching elements Q1, Q2 are respective MOSFETs that each have a parasitic diode, then due to the action of such parasitic diodes, the level of voltage surge that occurs at the time of switch-off of the switching element Q1 or switching element Q2 will generally be negligible or very low.

During operation in the step-down mode, some voltage surge occurs when a parasitic diode becomes reverse-biased. However this voltage surge is mainly due to resonance between the leakage inductance of the transformer and the stray capacitances of the switching elements, and is generally small.

However the levels of voltage surge generated due to switch-off of the switching elements Q1, Q2 during operation in the boost mode are substantial, and can apply an excessive amount of stress on these switching elements, as well as resulting in generation of electrical noise. Hence, these voltage surges present a serious problem.

With such a bidirectional DC-to-DC converter, which can be operated in the boost mode or in the back (step-down) mode, due to the high levels of voltage surge generated during boost operation it is necessary to use devices (generally MOSFETs) that have a high level of withstand voltage, as the switching elements Q1, Q2. For that reason, as described for example in Japanese patent first publication No. 2000-184710, it is known in the prior art to connect a snubber circuit to these switching elements, for absorbing the voltage surges.

Furthermore, with types of DC-to-DC converter of the form shown in FIGS. 14 and 24, which do not require the use of a choke coil, similar problems arise, resulting from the effects of the excitation inductance and leakage inductance of the transformer.

If a snubber circuit is added, then the number of components of the DC-to-DC converter is increased, and the circuit configuration made more complex, so that parts costs are increased.

SUMMARY OF THE INVENTION

It is an objective of the present invention to overcome the above problems, by providing a DC-to-DC converter control method whereby it becomes unnecessary to use additional circuits such as a snubber circuit or to use switching elements having a high value of withstand voltage, with the objective being achieved by effectively suppressing the voltage surges that occur during operation in the boost mode by appropriately determining the gate control sequence (i.e., switching control sequence) of the switching elements of the DC-to-DC converter.

The invention provides a method of controlling a DC-to-DC converter by operation of a switching control circuit, where the DC-to-DC converter comprises a first voltage system circuit (i.e., from which a converted output voltage is produced, or to which an input voltage is applied) that includes a first switching element (Q1) and a second switching element (Q2), a second voltage system circuit (from which a converted output voltage is produced, or to which an input voltage is applied) that includes a third switching element (Q3) and a fourth switching element (Q4), and electric power conversion means (in general, a transformer) for performing electric power conversion between the first voltage system circuit and the second voltage system circuit.

The switching control circuit performs complementary switching of the first switching element (Q1) and second switching element (Q2), and performs complementary on/off switching of the third switching element (Q3) and fourth switching element (Q4), synchronized with the switching of the first and third switching elements (Q1), (Q3). A condition in which both of the first and third switching elements are in the ON state and the second and fourth switching elements are in the OFF state is referred to herein as the No. 1 condition, while a condition in which both of the first and third switching elements are in the OFF state and the second and fourth switching elements are in the ON state is referred to as the No. 2 condition.

From a first aspect, in the case in which electrical power conversion is being performed from the first voltage system circuit to the second voltage system circuit via the electric power conversion means, the control method consists of cyclically performing a sequence of operations whereby, following each occasion when the No. 1 condition is established, the second switching element (Q2) is switched ON, to initiate a concurrent ON state of the first switching element (Q1) and second switching element (Q2), with the switch-on of the second switching element (Q2) being performed prior to performing switch-off of each of the first switching element (Q1) and of the third switching element (Q3) to establish the No. 2 condition.

With such a DC-to-DC converter, during a transition from the No. 1 condition to the No. 2 condition, a concurrent ON condition is established, in which each of the switching elements Q1, Q2 are concurrently ON. As a result, since current then flows not only in the switching element Q1 but also in the switching element Q2 of the No. 1 voltage system circuit, the level of current that flows in the switching element Q1 is reduced. After the level of current that flows in the switching element Q1 has been reduced to a lower level than that prior to switch-on of the switching element Q2, switch-off of the Q1 is performed. As a result, a voltage surge which would otherwise arise at the time of switch-off of the switching element Q1 can be reduced. suppressed.

With such a DC-to-DC converter control method, since the voltage surge is reduced only by suitably determining the gate control sequence for the switching elements, it becomes unnecessary to utilize a snubber circuit as utilized in the prior art, so that the circuit configuration of the DC-to-DC converter can be simplified and the manufacturing costs reduced.

Furthermore, as a result of performing switch-off of the switching element Q1 only after the level of current flowing in that switching element has been reduced, switching losses are reduced, so that the efficiency of the DC-to-DC converter can be increased.

Switch-off of the switching element Q1 may be performed at a point in time when the level of current through that switching element is close to zero. However preferably, switch-off of is performed at an arbitrary point within a time interval which begins at the end of an interval in the No. 1 condition (i.e., after the switching element Q2 becomes switched on), in which the level of current in the switching element falls close to zero, reaches zero, then becomes reversed in direction, with the level of the reverse direction current being substantially lower than the level of forward direction current (i.e., the current that flowed in the switching element Q1 prior to switch-on of the switching element Q2).

The lower the level of current that flows in the switching element Q1 at that time of switch-off, the smaller will be the amount of change in current when the switching element Q1 is switched off, and so the smaller will be the voltage surge. Hence by setting the switching elements Q1, Q2 in the ON state concurrently to thereby reduce the current that flows in the switching element Q1, and switching off the switching element Q1 at a time point when its current has become approximately zero or has attained a low level of reverse direction current, the voltage surge that results from such switch-off can be made extremely small.

The advantage of performing switch-off of the switching element Q1 at some point during the aforementioned interval in which the level of current in the switching element falls close to zero, reaches zero, then becomes reversed in direction, is that such an interval is of substantial duration. Hence, it is unnecessary to determine the timings for switch-off of the switching element Q1 very precisely, so that the flexibility of the design can be improved, and inspection cost can be reduced. This is a significant advantage, in practice.

A diode may be connected in parallel with the switching element Q1 in a configuration whereby, if the switching element Q1 is switched off after the direction of current flow in that switching element has become reversed, the current that was previously flowing in the switching element Q1 then flows through the diode. As a result, almost no voltage surge will be produced, since the only voltage developed across the switching element Q1 will be the voltage drop across the diode, which can be sufficiently small that it does not present a problem. Thus in this case too, switch-off of the switching element Q1 can be performed at any time within an interval that is of substantial duration.

When a device such as a MOSFET is used as the switching element Q1, the diode can simply consist of a parasitic diode that is intrinsic to the MOSFET (i.e., appears between the source and drain). With other types of switching element, an external diode can be connected in parallel with the switching element.

From another aspect the electric power conversion means is a transformer having a first winding (Wa) that is connected to the first voltage system circuit and a second winding (Wb) that is connected to the second voltage system circuit, with the first voltage system circuit being configured to apply a short-circuit across the first winding (Wa) under a condition in which both of the first switching element (Q1) and the second switching element (Q2) are concurrently in the ON state. The second voltage system circuit preferably includes an active clamp circuit formed of a fourth switching element (Q4) and a first capacitor (C1) connected in series, with the active clamp circuit being connected in parallel with either the second winding (Wb) and the third switching element (Q3). The second voltage system circuit also includes current supply means connected to the second winding (Wb).

In general, the function of such current supply means can be implemented by a smoothing capacitor which smooths the output voltage of the second voltage system circuit when power conversion is performed from the first to the second voltage system circuit.

With this control method, when power conversion is being performed from the first to the second voltage system circuit, each time that transition is performed from the No. 1 condition to the concurrent ON state, the current supply means supplies a current to the second winding (Wb) during the concurrent ON state, which flows in a direction that is the reverse of the current that flowed in the second winding (Wb) before the second switching element (Q2) was switched on (to initiate the concurrent ON state). Hence, the level of current flowing in the first switching element (Q1) becomes rapidly reduced, during and after the interval of concurrent ON state, due to the flow of reverse direction current through the second winding (Wb).

In that way, the occurrence of a voltage surge at times of switch-off of the first switching element (Q1) can be even more effectively suppressed, since switch-off can be performed at a point when the level of current in that switching element is close to zero.

From another aspect the invention can be applied to a DC-to-DC converter in which the electric power conversion means is a transformer having a first winding (Wa) connected to the first voltage system circuit and a second winding (Wb1) and third winding (Wb2) connected to the second voltage system circuit, with the first voltage system circuit configured to apply a short-circuit across the first winding (Wa) under a condition in which both of the first switching element (Q1) and the second switching element (Q2) are concurrently in the ON state. The second voltage system circuit includes an active clamp circuit formed of a fourth switching element (Q4) and a first capacitor (C1) connected in series, with the active clamp circuit being connected in parallel with either the second winding (Wb1) or the third winding (Wb2) or the third switching element (Q3). A second capacitor (C2) which is connected in series with the third winding (Wb2) and the third switching element (Q3) to form a closed circuit, and a current supply means is connected to the second winding (Wb1), With a control method according to this aspect of the invention, when electrical power conversion is being performed from the first voltage system circuit to the second voltage system circuit, each time that transition is performed from the No. 1 condition to the aforementioned concurrent ON state, the current supply means supplies a current to the second winding (Wb1) during the concurrent ON state, flowing in a direction that is the reverse of the direction of current flowing in the second winding (Wb1) prior to commencement of the concurrent ON state.

Hence, the current flowing in the first switching element (Q1) becomes rapidly reduced due to the reverse-direction current that flows through the second winding (Wb1).

In that way, the occurrence of a voltage surge at times of switch-off of the first switching element (Q1) can be even more effectively suppressed, since switch-off can be performed at a point when the level of current in that switching element is close to zero.

That is to say, when power conversion is performed from the No. 1 voltage system circuit to the No. 2 voltage system circuit, each time that transition is performed from the No. 1 condition to the concurrent ON condition, the terminals of the first winding become short-circuited, so that the voltage applied to the first winding is approximately zero. A current is supplied to the second winding, from the current supply means (for example, an output smoothing capacitor of the second voltage system circuit), with that supplied current flowing in the opposite direction to the current that is flowing in the second winding before the switching element Q2 is switched on (to commence the concurrent ON state). Hence, the current flowing in the switching element Q1 is quickly reduced as a result of the reverse-direction flow of current through the second winding of the transformer.

After the current flowing in the switching element Q1 has been reduced to a sufficiently low level, the switching element Q1 is switched off. Thus the level of voltage surge produced at switch-off of the switching element Q1 is made small.

From another aspect, the invention can be applied to a DC-to-DC converter in which the electric power conversion means consists of a first transformer having a first winding (Wa1) connected in series with the first switching element (Q1) and a second winding (Wb1) connected to the second voltage system circuit, and a second transformer having a first winding (Wa2) connected in series with the second switching element (Q2) and a second winding (Wb2) that is connected to the second voltage system circuit. The first voltage system circuit is configured with a closed circuit formed by the series-connected first winding (Wa1) of the first transformer and the first switching element (Q1) and the series-connected first winding (Wa2) of the second transformer and the second switching element (Q2).

The second voltage system circuit includes an active clamp circuit that is formed of a fourth switching element (Q4) and a capacitor (C1) connected in series, with the active clamp circuit being is connected in parallel with the series-connected second windings (Wb1, Wb2) of the first and second transformers, or with the third switching element (Q3). The second voltage system circuit further includes current supply means (such as an output smoothing capacitor of the second voltage system circuit) connected to the series-connected second winding (Wb1) of the first transformer and second winding (Wb2) of the second transformer.

When electrical power conversion is being performed from the first voltage system circuit to the second voltage system circuit, each time that transition is performed from the No. 1 condition to the concurrent ON state, the current supply means begins to supply a current to the second winding (Wb1) of the first transformer and second winding (Wb2) of the second transformer, with the current flowing in the reverse direction to the direction of current flow in these windings prior to switch-on of the second switching element (Q2), i.e., prior to commencement of the concurrent ON state.

As a result, the level of current flowing in the first switching element (Q1) becomes rapidly reduced due to the reverse-direction current that flows through the second windings (Wb1, Wb2) of each of the first and second transformers, and hence the current in the first switching element (Q1) can be made substantially equal to zero at each time point when switch-off of that switching element is performed. Generation of voltage surges can thereby be effectively suppressed.

From another aspect, the invention can be applied to a DC-to-DC converter in which the electric power conversion means consists of a first transformer having a first winding (Wa1) connected in series with the first switching element (Q1) and a second winding (Wb1) and a third winding (Wb3) connected to the second voltage system circuit, and a second transformer having a first winding (Wa2) connected in series with the second switching element (Q2) and a second winding (Wb2) and a third winding (Wb4) connected to the second voltage system circuit, with the second winding (Wb1) of the first transformer and second winding (Wb2) of the second transformer being connected in series and the third winding (Wb3) of the first transformer and the third winding (Wb4) of the second transformer being connected in series.

The first voltage system circuit is configured with a closed circuit formed by the series-connected first winding (Wa1) of the first transformer and the first switching element (Q1) and the series-connected first winding (Wa2) of the second transformer and the second switching element (Q2).

The second voltage system circuit includes an active clamp circuit that is formed of a fourth switching element (Q4) and a capacitor (C1) connected in series, with the active clamp circuit being connected in parallel with the series-connected second winding (Wb1) of the first transformer and second winding (Wb2) of the second transformer or with the series-connected third winding (Wb3) of the first transformer and third winding (Wb4) of the second transformer or with the third switching element (Q3). The second voltage system circuit further includes a second capacitor (C2) which is connected in series with the third winding (Wb3) of the first transformer and third winding (Wb4) of the second transformer and the third switching element (Q3) to form a closed circuit, and current supply means (such as an output voltage smoothing capacitor of the second voltage system circuit)

connected to the series-connected second winding (Wb1) of the first transformer and second winding (Wb2) of the second transformer.

With a control method according to this aspect of the invention, when power conversion is being performed from the first voltage system circuit to the second voltage system circuit, each time that transition is performed from the No. 1 condition to the aforementioned concurrent ON state, the current supply means supplies a current to the second winding (Wb1) of the first transformer and second winding (Wb2) of the second transformer, with that supplying of current beginning from the commencement of the concurrent ON state (i.e., from the point of switch-on of the second switching element (Q2)).

As a result, after transition from the No. 1 condition to the concurrent ON state is performed, the level of current flowing in the first switching element (Q1) becomes rapidly reduced, as a result of supplying the reverse-direction current through the second winding (Wb1) of the first transformer and second winding (Wb2) of the second transformer. Thus the switching element Q1 can thereafter be switched off at a time when the current flowing through that switching element is sufficiently small (e.g., close to zero) to eliminate voltage surges.

With each of the DC-to-DC converter configurations described above, the invention similarly provides control methods whereby occurrence of voltage surges at times of switch-off of the second switching element (Q2) of the first voltage system circuit can be similarly prevented, when power conversion is performed from the first voltage system circuit to the second voltage system circuit, as described in the following referring to specific embodiments.

DESCRIPTION OF PREFERRED EMBODIMENTS

First Embodiment

Figure 1:
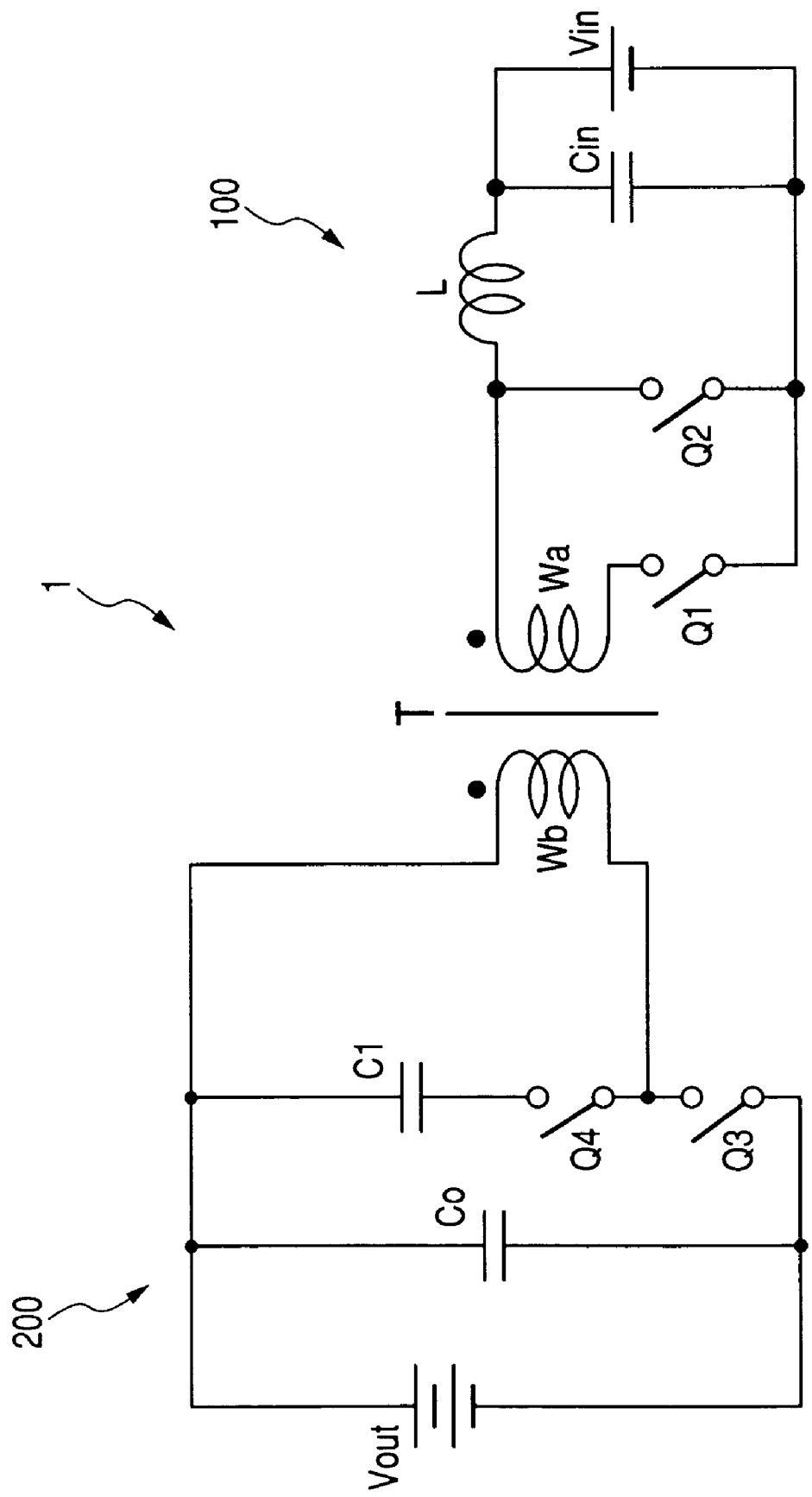
FIG. 1 is a circuit diagram of a first embodiment of a DC-to-DC converter.

A first embodiment will be described referring first to FIG. 1. This embodiment is a DC-to-DC converter 1 that is made up of a No. 1 voltage system circuit 100 which can be connected to a No. 1 DC power source 10, a No. 2 voltage system circuit 200 that can be connected to a No. 2 DC power source 20, a transformer T for converting electrical power between the No. 1 voltage system circuit 100 and the No. 2 voltage system circuit 200, a switching control circuit (not shown in the drawings) which controls switching elements to operate sequentially as described hereinafter, switching elements Q1, Q2 in the No. 1 voltage system circuit 100, and switching elements Q3, Q4 in the No. 2 voltage system circuit 200, each controlled by the switching control circuit. It will be assumed that power conversion is being performed from the No. 1 voltage system circuit 100 to the No. 2 voltage system circuit 200 in the aforementioned boost mode (i.e., with an input DC supply voltage at level Vin being inputted to the No. 1 voltage system circuit 100 and an output DC voltage at a level Vout which is higher than Vin being produced from the No. 2 voltage system circuit 200).

The transformer T includes a winding Wa that is connected to the No. 1 voltage system circuit 100 and a winding Wb that is connected to the No. 2 voltage system circuit 200, with the winding Wa and winding Wb being electrically isolated from one another.

The No. 1 voltage system circuit 100 also includes a smoothing circuit formed of a choke coil L and a capacitor Cin. The switching elements Q1, Q2 of the No. 1 voltage system circuit 100 will be assumed to be formed using MOSFETs. As shown, the choke coil L is connected between the high-potential side of the No. 1 DC power source 10 and a first end of the winding Wa, the capacitor Cin is connected in parallel with the No. 1 DC power source 10, the switching element Q2 is connected between low-potential side of the No. 1 DC power source 10 and the junction of the winding Wa and choke coil L, and the switching element Q1 is connected in series between the low-potential side of the No. 1 DC power source 10 and the second end of the winding Wa.

The No. 2 voltage system circuit 200 is formed of the switching elements Q3, Q4, a capacitor C1 that is connected in series with the switching element Q4 to constitute an active clamp circuit that is connected in parallel with the winding Wb, with the switching element Q3 connected between the junction of the winding Wb and switching element Q4 and one terminal of a smoothing capacitor Co. The other terminal of the smoothing capacitor Co is connected to the junction of the capacitor C1 and the winding Wb. With the No. 2 voltage system circuit 200 connected to an electrical load, the high-potential side of the output voltage of the No. 2 voltage system circuit 200 corresponds to the junction of the capacitors Co, C1 and one end of the winding Wb, while the low-potential side of the output voltage of the No. 2 voltage system circuit 200 corresponds to the junction of the capacitor Co and the switching element Q3.

Figure 3:
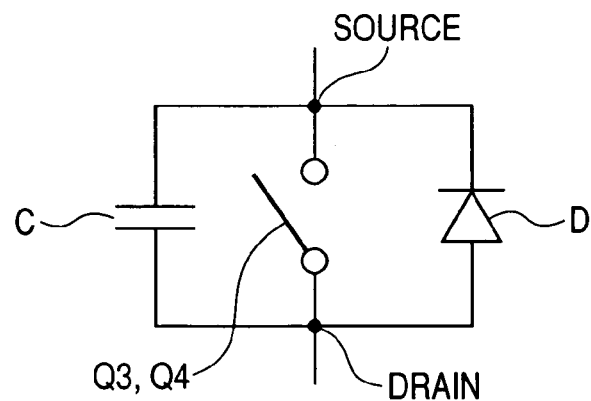
FIG. 3 is an equivalent circuit diagram, illustrating a parasitic diode and stray capacitance of a MOSFET used as a switching element.

The switching elements Q3, Q4 are formed of the same type of semiconductor elements as the switching elements Q1, Q2, and will be assumed to be respective MOSFETs. As illustrated in the equivalent circuit diagram of FIG. 3, each of the switching elements has a parasitic diode D and stray capacitance C.

On/off switching control of the switching elements Q1, Q2, Q3, Q4 is performed by the switching control circuit (not shown in the drawings) using the gate control sequence shown in FIGS. 2(a) to 2(d). This sequence is repetitively executed, with a repetition period Ts.

FIGS. 2(a) to 2(d) show the respective gate voltages applied to the switching elements Q1, Q2, Q3, Q4, with each switching element being switched on when the corresponding gate voltage goes to the high level, and switched off when the corresponding gate voltage goes to the low level.

FIGS. 2(e), 2(f) show the respective drain currents of the switching elements Q1, Q2, with positive values representing levels of current flow in the drain to source direction. FIGS. 2(g), 2(h) show the respective drain-to-source voltages of the switching elements Q1, Q2.

FIG. 2(i) shows current that flows in the winding Wb, with positive values corresponding to flow in the upward direction, as seen in the circuit diagrams of FIGS. 4 to 12. FIG. 2(j) shows current that flows in the capacitor C1, with positive values corresponding to flow in the upward direction, as seen in the circuit diagrams of FIGS. 4 to 12. FIG. 2(k) shows drain current that flows in the switching element Q3, with positive values representing levels of current flow in the source to drain direction.

The designations Td1, Td2 in FIG. 2(d) indicate dead times, in which transition is performed between the on and OFF states of the switching elements Q3, Q4, i.e., intervals in which both of the switching elements Q3, Q4 are concurrently in the OFF state. With the present invention, these dead times are essential.

The operation for power conversion from the No. 1 voltage system circuit 100 to the No. 2 voltage system circuit 200 will be described referring to the timing diagram of FIG. 2 and the circuit diagrams of FIGS. 4 to 12, which illustrate the currents that flow at each of respective timings. In the following description, the condition in which both the switching element Q1 and switching element Q3 are in the ON state and both of the switching element Q2 and switching element Q4 are in the OFF state will be referred to as the No. 1 condition. The condition in which both the switching element Q1 and switching element Q3 are in the OFF state and both of the switching element Q2 and switching element Q4 are in the ON state will be referred to as the No. 2 condition.

(a) Interval [t0≦t≦t1]

Figure 4:
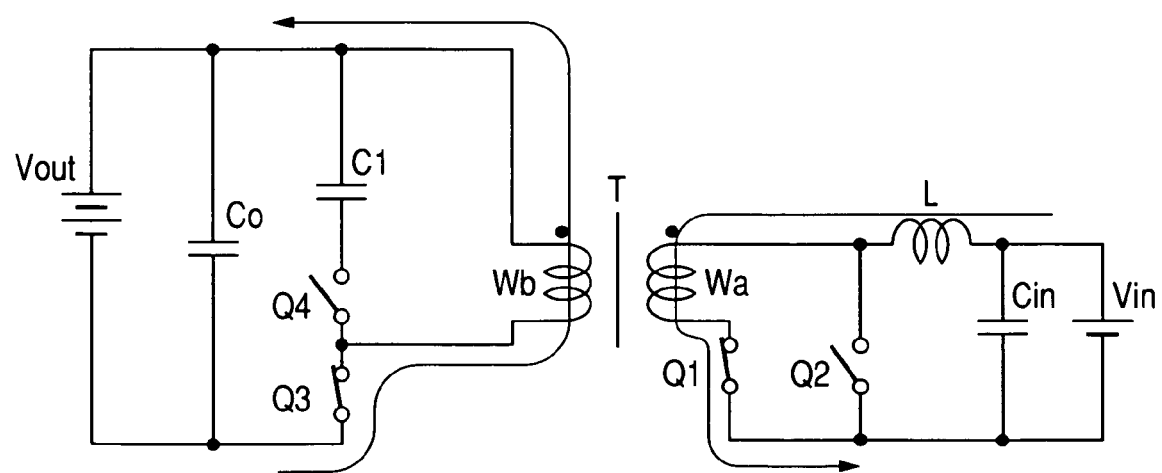
FIGS. 4 to 12 are circuit diagrams for describing current flows within the first embodiment during respective time intervals.

As shown in FIG. 4, during this interval the switching elements Q1, Q3 are ON, while switching elements Q2 and Q4 are OFF, i.e., the No. 1 condition is established. Hence in the No. 1 voltage system circuit 100, current flows in the direction:

No. 1 DC power source 10→choke coil L→winding Wa→switching element Q1.

As a result, the magnetic energy stored in the choke coil L and the power of the No. 1 DC power source 10 are transferred by the transformer T to the No. 2 voltage system circuit 200, so that current flows in the winding Wb of the transformer T as shown in by the arrow direction in FIG. 4. In addition, magnetic energy becomes stored in the transformer T.

(b) Interval [t1≦t≦t2]

In this interval with the switching element Q2 having been switched on at time point t1, all of the switching elements Q1, Q2 and Q3 are in the ON state. In the following, a condition in which each of the switching elements Q1, Q2 are concurrently in the ON state will be referred to as a "concurrent ON state". In that condition, the winding Wa becomes short-circuited by the switching elements Q1, Q2, so that the voltage across the winding Wa becomes approximately zero. Similarly, the voltage across the winding Wb becomes approximately zero. As a result, a short-circuit exists across the terminals of the smoothing capacitor Co, however due to the leakage inductance of the transformer T this is not a complete short-circuit.

Figure 5:
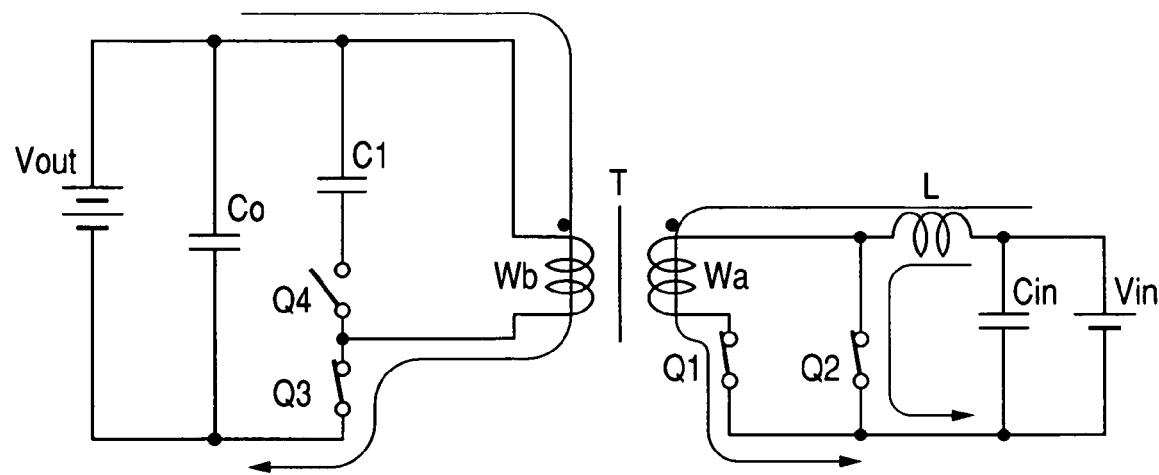
Figure 6:
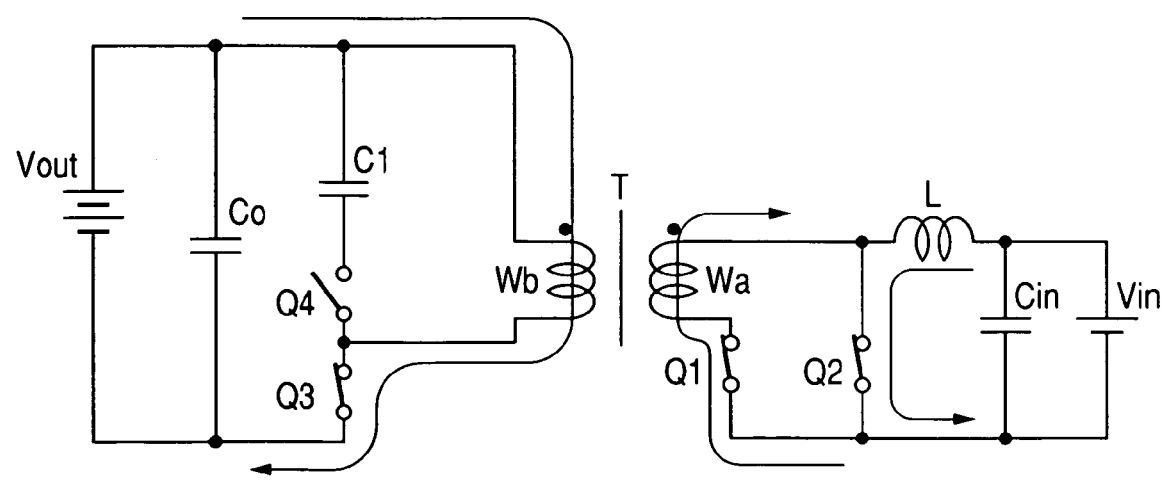

Due to this, the charge stored in the smoothing capacitor Co becomes discharged along the direction shown by the arrow in FIG. 5, so that the direction of current flow in the winding Wb becomes reversed. At this time, the DC output voltage level of the No. 2 voltage system circuit 200 is substantially equal to the (instantaneous) value of voltage across the smoothing capacitor Co.

When the current direction flowing in the winding Wb becomes reversed, rapidly reduced (see FIG. 2(e)), since the current flowing in the switching element Q2 rapidly increases due to the action of the choke coil L (see FIG. 2(f)). Hence, the level of current in the switching element Q1 decreases from time point t1 to t2.

(c) Interval [t2≦t≦t3]

Figure 7:
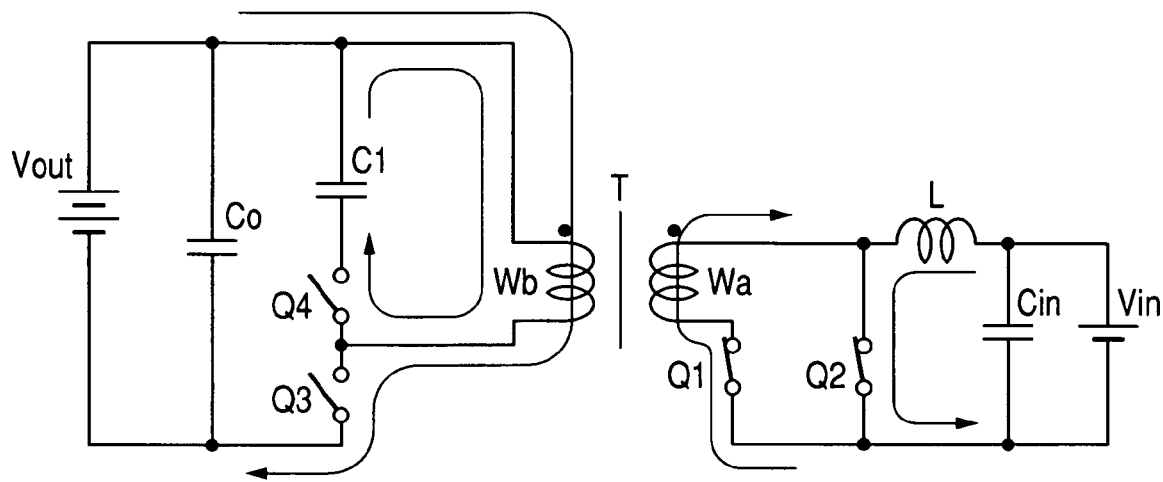

During this concurrent ON state of the switching elements Q1, Q2, when the switching element Q3 is switched off at time point t2, then in the No. 2 voltage system circuit 200, resonance occurs at a frequency determined by the leakage inductance of the transformer T and the stray capacitances of the switching elements Q3, Q4 (as shown in FIG. 7), i.e., resulting in a damped oscillation of the current flow through the switching element Q1.

As a result, in the No. 1 voltage system circuit 100, the current flowing in the switching element Q1 after falling to zero (see FIG. 2(e)), then reverses in direction and thereafter gradually returns to zero, reaching that state (approximately) at time point t3.

The current will thereafter again flow in the forward direction (due to the damped oscillation), however the amplitude of any subsequent flow of current through the switching element Q2 is sufficiently small that it can be ignored, and so is not shown in FIG. 2(e).

With this embodiment, switch-off of the switching element Q1 is performed at time point t3, when the current through that switching element has returned to a level close to zero, after having become momentarily reversed in direction.

Due to perform switch-off of the switching element Q1 when the current flow through that switching element is equal to or close to zero, the voltage surge developed at switch-off of that switching element is extremely small. Hence, it becomes possible to utilize a MOSFET having only a low value of withstand voltage as the switching element Q1.

Furthermore, the "soft switching" effect resulting from switch-off of the switching element Q1 at a point when the current flowing in that switching element has been reduced to approximately zero enables switching losses to be greatly reduced.

(d) Interval [t3≦t≦t5]

Figure 8:
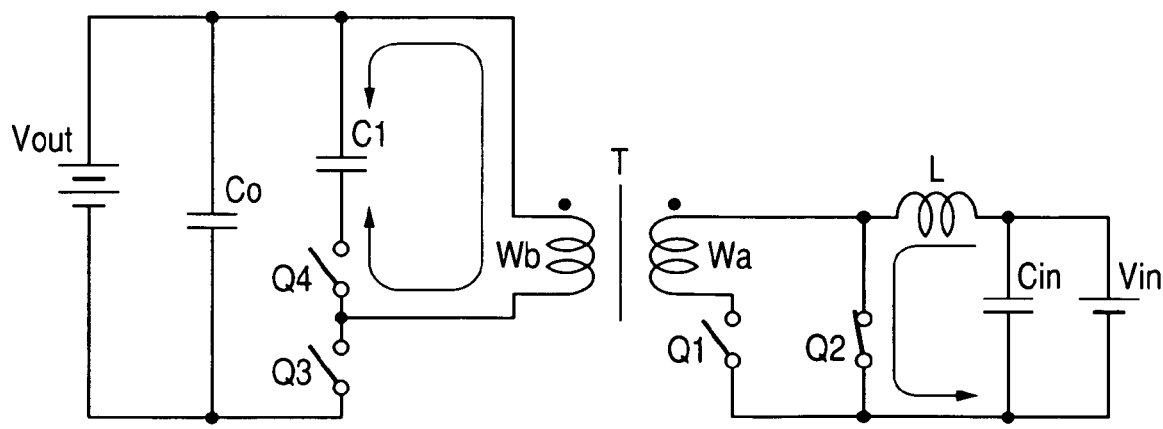

When the switching element Q1 enters the OFF state then as shown in FIG. 8, in the No. 1 voltage system circuit 100, magnetic energy becomes stored in the choke coil L due to current that flows in a path:

No. 1 DC power source 10→choke coil L→switching element Q2

In the No. 2 voltage system circuit 200 on the other hand, the excitation current of the transformer T flows in a closed circuit formed by the active clamp circuit (constituted by the capacitor C1 and the switching element Q4) and the winding Wb. Due to the action of the active clamp circuit at this time, firstly current flows in a direction for charging the capacitor C1 (i.e., along the clockwise direction around the closed circuit, as seen in FIG. 8). Current then flows (see FIG. 2(j)) in a direction for discharging the capacitor C1 (i.e., along the anti-clockwise direction around the closed circuit, as seen in FIG. 8).

When current flows in the clockwise direction in the closed circuit, thereby charging the capacitor C1, i.e., when current is flowing through the parasitic diode of the switching element Q4 (at time point t4), transition to the No. 2 condition is executed by switch-on of the switching element Q4, so that a "soft switching" effect is achieved, enabling switching losses to be greatly reduced.

(e) Interval [t5≦t≦t6]

Figure 9:
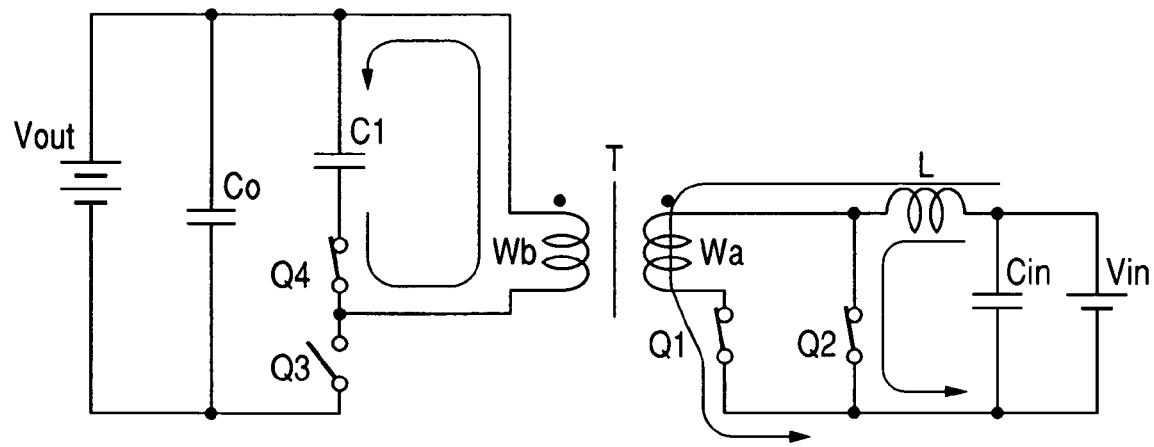

When transition is performed from the No. 2 condition to the concurrent ON state, by switch-on of the switching element Q1 at time point t5, then since at that time the winding Wa is short-circuited by the switching elements Q1, Q2, the voltage applied to the winding Wa is substantially zero, as is the voltage applied to the winding Wb. As a result, the capacitor C1 becomes short-circuited, although this is not a complete short-circuit, due to effects of the leakage inductance of the transformer T. Hence as shown in FIG. 9, discharge of the capacitor C1 occurs, so that the current flowing in the winding Wb becomes rapidly increased. As a result, the current flowing in the switching element Q2 is rapidly reduced (see FIG. 2(f)). On the other hand, the current flowing in the switching element Q1 rapidly increases (see FIG. 2(e)).

Figure 10:
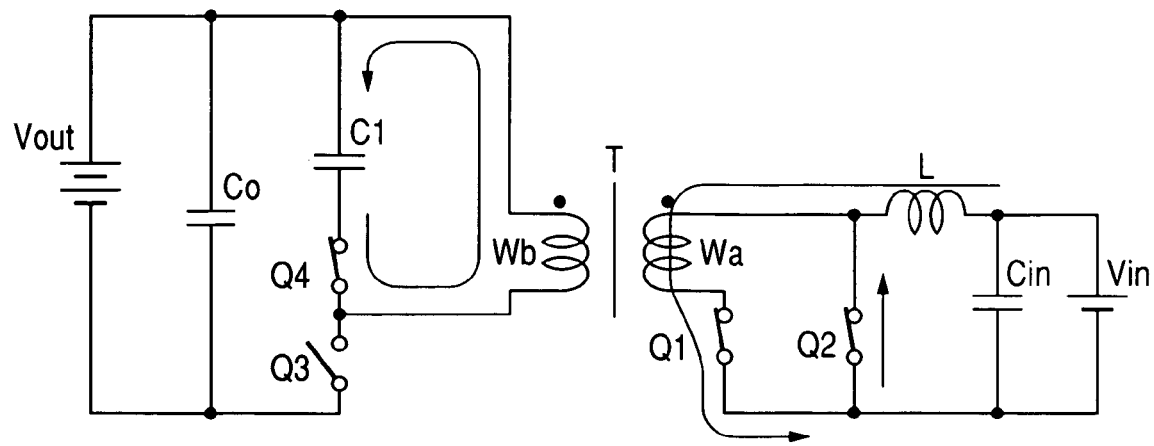

As this concurrent ON state of the switching elements Q1, Q2, current flowing in the switching element Q2 then reaches zero, and thereafter reverses direction (i.e., overshoot of the current flow occurs), as illustrated in FIG. 10 and FIG. 2(f).

(f) Interval [t6≦t≦t7]

Figure 11:
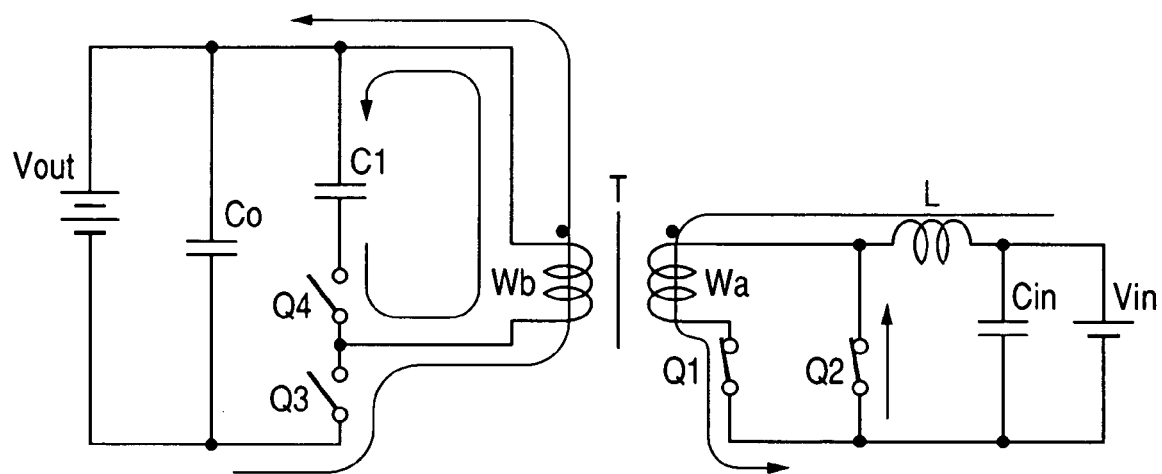

As the concurrent ON state, when the switching element Q4 is switched off at time point t6, then in the No. 2 voltage system circuit 200, resonance occurs at a frequency determined by the leakage inductance of the transformer T and the stray capacitances of the switching elements Q3, Q4 (see FIG. 11). As a result (for the same reasons described above for the interval t2 to t3 concerning the switching element Q2) the current flowing in the switching element Q2 after flowing in the reverse direction, returns to zero. The approximately time point at which this occurs is t7, and switch-off of the switching element Q2 is performed at that point. (see FIG. 2(f)).

Due to the fact that the level of current through the switching element Q2 has become approximately zero at the time point of switch-off, the voltage surge that is developed at switch-off is extremely small. Hence it becomes possible to utilize an inexpensive type of MOSFET having only a low value of withstand voltage as the switching element Q2.

Furthermore, such a "soft switching" effect, with only a very low level or zero level of current passing through the switching element Q2 at the point of switch-off, enables switching losses to be greatly reduced.

(g) Interval [t7≦t≦t8]

Figure 12:
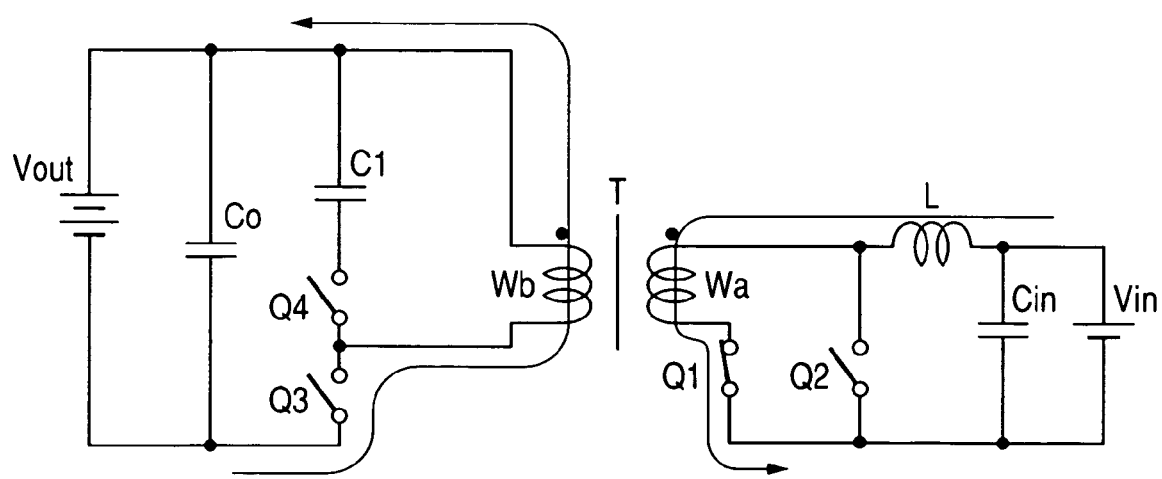

As shown in FIG. 12, in the condition in which the switching element Q1 is ON and each of the switching elements Q2, Q3, Q4 are OFF, then in the No. 1 voltage system circuit 100, current flows along a path:

No. 1 DC power source 10→choke coil L→winding Wa→switching element Q1

In the No. 2 voltage system circuit 200 on the other hand, since the switching element Q3 is in the OFF state, current flows through the parasitic diode of the switching element Q3 to the winding Wb, in the direction indicated by the arrow in FIG. 12. Hence the voltage applied to the switching element Q3 becomes close to zero (actually, becomes the forward voltage of the parasitic diode D of that switching element). Thereafter, the switching element Q3 is switched on at time point t8 (=t0), and the No. 1 condition is returned to. Since switch-on of the switching element Q3 is performed at a time point when the applied voltage of that switching element is approximately zero, a "soft switching" effect is achieved, enabling switching losses to be greatly reduced.

Furthermore, since synchronous rectification is effected by the switch-on of the switching element Q3, high efficiency is achieved.

The above sequence of operations (a) to (g) is cyclically repeated.

Effects of First Embodiment

With the DC-to-DC converter control method described above, applied to the first embodiment, when transition occurs from the No. 1 condition to the No. 2 condition, the switching element Q2 is switched on before the switching elements Q1, Q3 are switched off. Switch-off of the current flowing in the switching element Q1 is performed when the level of that current is close to zero. Hence, only a small level of voltage surge is developed across the switching element Q1, and the logical value of that voltage surge can be zero.

Similarly, when transition occurs from the No. 2 condition to the No. 1 condition, then before switch-off of the switching elements Q2 and Q4 is performed, the switching element Q1 is switched on, to establish a concurrent ON state in which the level of current flowing in the switching element Q2 becomes reduced. Thus the switching element Q2 can be switched off at a time point when the current flowing in that switching element has become approximately zero. Hence, only a small level of voltage surge is developed across the switching element Q2, and the logical value of that voltage surge can be zero.

With the above control method, a gate control sequence is applied whereby the voltage surges of the switching elements Q1, Q2 are suppressed, so that it becomes unnecessary to utilize additional snubber circuits such as are required in the prior art. Hence the circuit configuration can be simplified and the parts cost reduced.

Furthermore, due to the fact that switch-off of the switching elements Q1, Q2 is performed at time points when the current flowing in these switching element is approximately zero, a "soft switching" effect is achieved, enabling switching losses to be greatly reduced. The DC-to-DC converter 1 can thereby have a high conversion efficiency.

The appropriate time points for switch-off of the switching element Q1 (or switching element Q2) can be determined experimentally beforehand, based on the duration and timing of the interval t2 to t3 (or the interval t6 to t7) which elapses from the point at which the direction of current flow in the winding Wb (see FIG. 2(i)) becomes inverted (after having been reduced to zero) and the direction of current flow through the switching element Q1 (or Q2) accordingly becomes inverted, up to the point at which the current flow in the switching element Q1 (or switching element Q2) thereafter again returns to zero.

The above description assumes that the switch-off of each switching element Q1 (or Q2) is performed at a specific time point when the current flowing in that switching element is approximately zero. However since the level of current that flows in the reverse direction will in practice be low (or the voltage developed across the switching element Q1 or Q2 while current is flowing in the reverse direction is low due to the presence of a parasitic diode, or can be made low by connecting an external diode in parallel with the switching element, as described above), it may be possible to perform switch-off of the switching element Q1 (or Q2) at any arbitrary point within such an interval t2 to t3 (or t6 to t7), i.e., an interval during which the current flow through the switching element is close to zero or is in the reverse direction.

Hence, since such an interval is of substantial duration, it is not necessary to set the timings of switch-off of the switching element Q1 (or Q2) very precisely, in order to ensure that the level of voltage surge produced at switch-off of the switching element will be sufficiently low. Thus, the flexibility of the design can be improved, and inspection cost can be reduced, by comparison with an apparatus in which the switch-off timings of specific switching elements must be precisely controlled.

Second Embodiment

Figure 13:
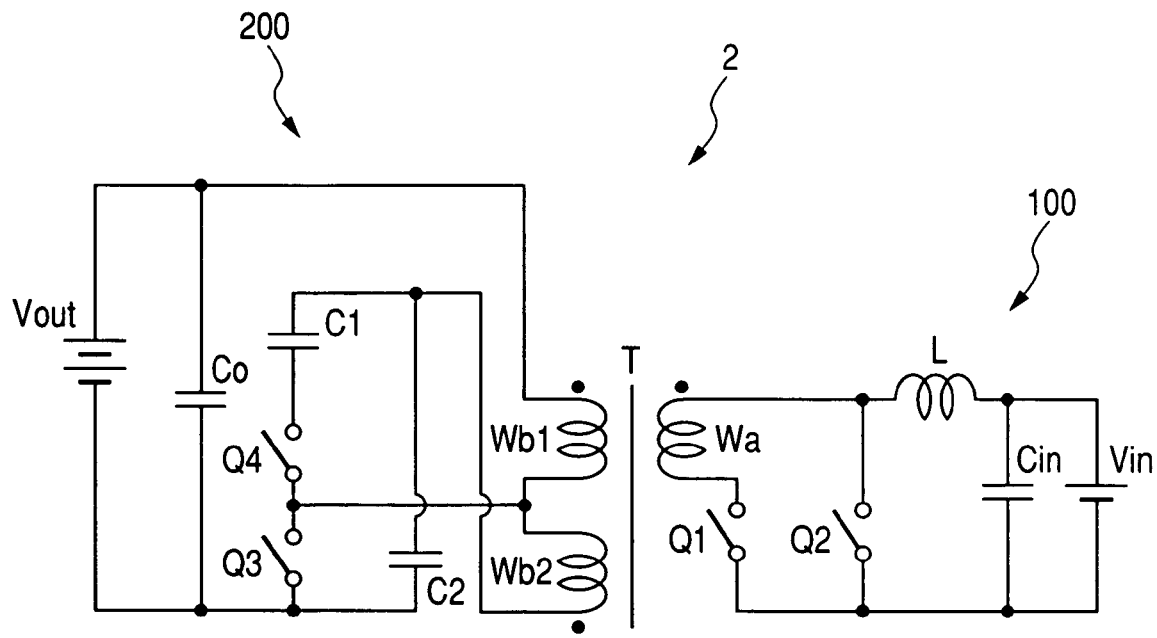
FIG. 13 is a circuit diagram of a second embodiment of a DC-to-DC converter.

FIG. 13 shows a second embodiment of a DC-to-DC converter, designated by numeral 2. The DC-to-DC converter 2 differs from the DC-to-DC converter 1 of the first embodiment with respect to the configuration of the No. 2 voltage system circuit 200. With the second embodiment, as shown in FIG. 13, a winding Wb1 and a winding Wb2 are provided on the transformer T, connected in series, with a capacitor C2 being connected in series with the winding Wb2 for performing a smoothing function. If the winding Wb of the DC-to-DC converter 1 of the first embodiment were to be replaced by the winding Wb1, then apart from the smoothing function, the circuit configuration would be identical to that of the first embodiment.

With the DC-to-DC converter 2 of the second embodiment, the same effects are obtained as for the first embodiment, but with the addition of a smoothing function.

Third Embodiment

Figure 14:
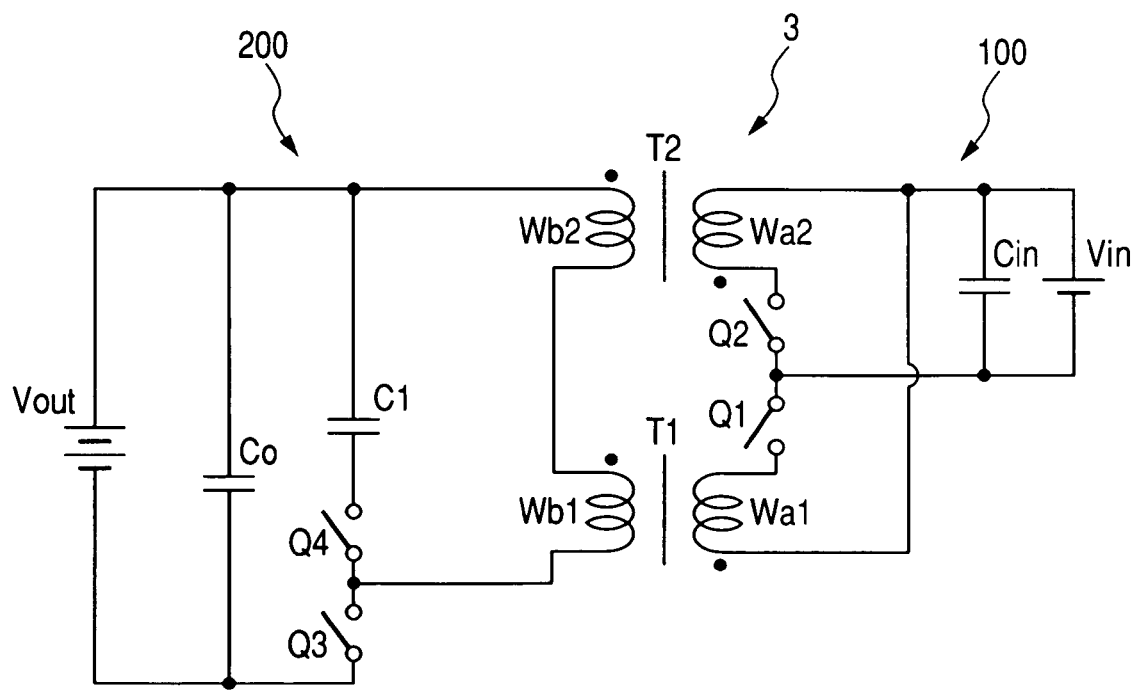
FIG. 14 is a circuit diagram of a third embodiment of a DC-to-DC converter.

FIG. 14 shows a third embodiment of a DC-to-DC converter, designated by numeral 3. As shown in FIG. 14, the DC-to-DC converter 3 utilizes two transformers. Apart from the transformer configuration, the configuration of this embodiment is identical to that of the first embodiment. The transformers T1 and T2 have respective windings Wa1 and Wa2 connected to the No. 1 voltage system circuit 100, and respective windings Wb1 and Wb2 connected to the No. 2 voltage system circuit 200. The windings Wa1, Wa2 are respectively connected in series with the switching element Q1 and the switching element Q2, and are connected in parallel with the No. 1 DC power source 10.

The windings Wb1, Wb2 are connected in series with the with the switching element Q3, and the series-connected combination of the windings Wb1, Wb2 and the switching element Q3 are connected in parallel with the input/output terminals of the No. 2 voltage system circuit 200, i.e., across which the output voltage of the No. 2 voltage system circuit 200 is applied to a load, or across which an input DC voltage source may be connected when electrical power conversion is performed from the No. 2 voltage system circuit 200 to the No. 1 voltage system circuit 100. In addition, the series-connected windings Wb1, Wb2 are connected in parallel with the active clamp circuit formed of the capacitor C1 and switching element Q4.

Figure 2:
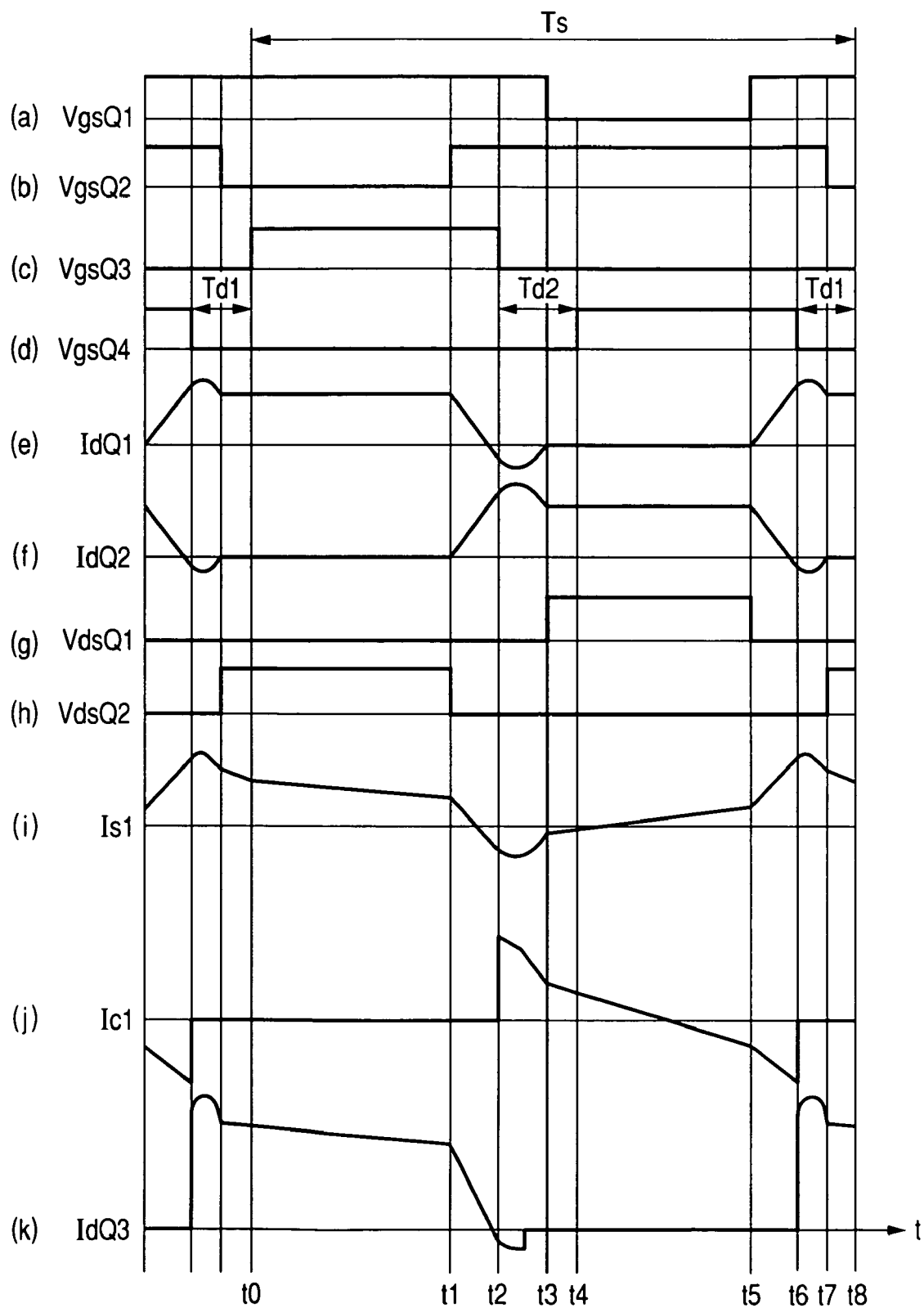
FIG. 2 is a timing diagram for describing the operation of the first embodiment and of a third embodiment.

The operation whereby power conversion is performed from the No. 1 voltage system circuit 100 to the No. 2 voltage system circuit 200 will be described referring to the timing diagram of FIG. 2, since the diagram contents are the same for the first embodiment (other than in that, in this case, FIG. 2(i) shows the current that flows through the series-connected windings Wb1, Wb2). The description will also be given referring to the circuit diagrams of FIGS. 15 to 23, which illustrate flows of current within the circuit at respective time points.

(a) Interval [t0≦t≦t1]

Figure 15:
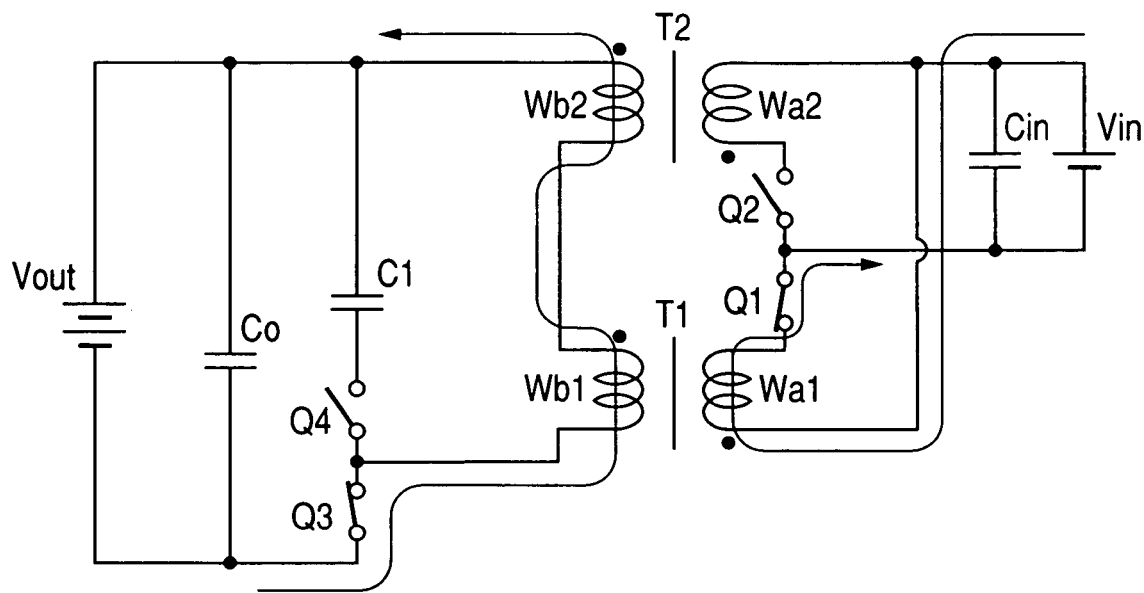
FIGS. 15 to 23 are circuit diagrams for describing current flows within the third embodiment during respective time intervals.

As shown in FIG. 15, during this interval the switching elements Q1, Q3 are set ON, while switching elements Q2 and Q4 are set OFF, i.e., the No. 1 condition is established. Hence in the No. 1 voltage system circuit 100, current flows in the direction:

No. 1 DC power source 10→winding
  Wa1→switching element Q1.

As a result, the power of the No. 1 DC power source 10 is transferred by the transformer T1 to the No. 2 voltage system circuit 200. In addition, magnetic energy becomes stored in the transformer T1, while magnetic energy stored in the transformer T2 is transferred to the No. 2 voltage system circuit 200. As a result, current flows in the windings Wb1, Wb2 and the No. 2 voltage system circuit 200 in the direction shown by the arrow.

(b) Interval [t1≦t≦t2]

Figure 16:
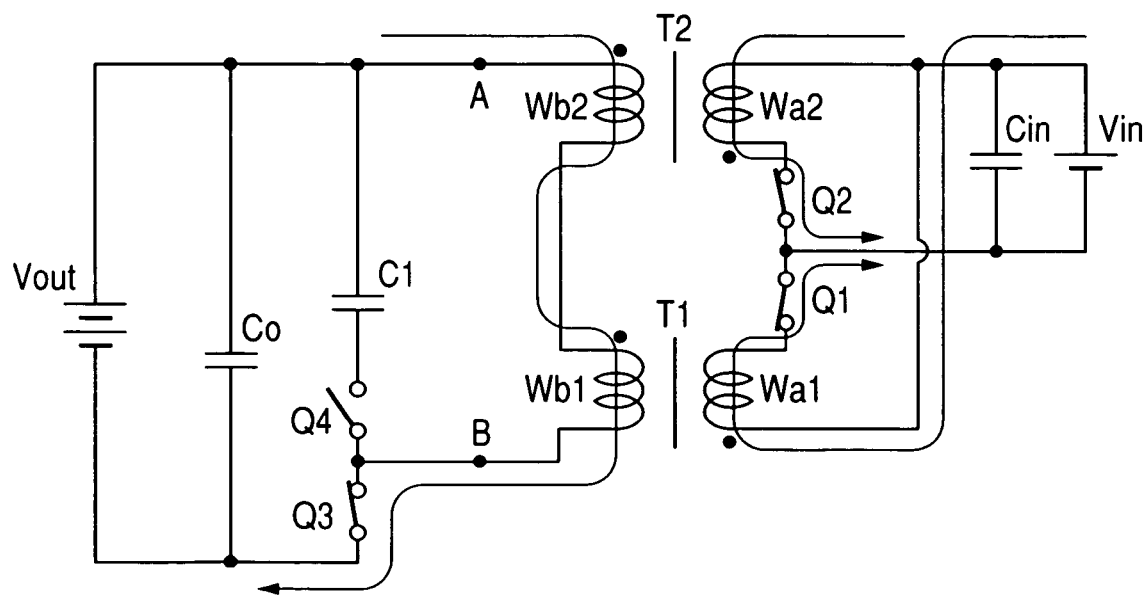

When the switching element Q2 is switched on, at time point t1 (so that a change occurs from the No. 1 condition to the concurrent ON condition), a voltage +Vin is applied to the winding Wa1, and a voltage −Vin is applied to the winding Wa2. Hence, the inductance between the points A-B shown in FIG. 16 is apparently the sum of the leakage inductances of the transformers T1 and T2.

Figure 17:
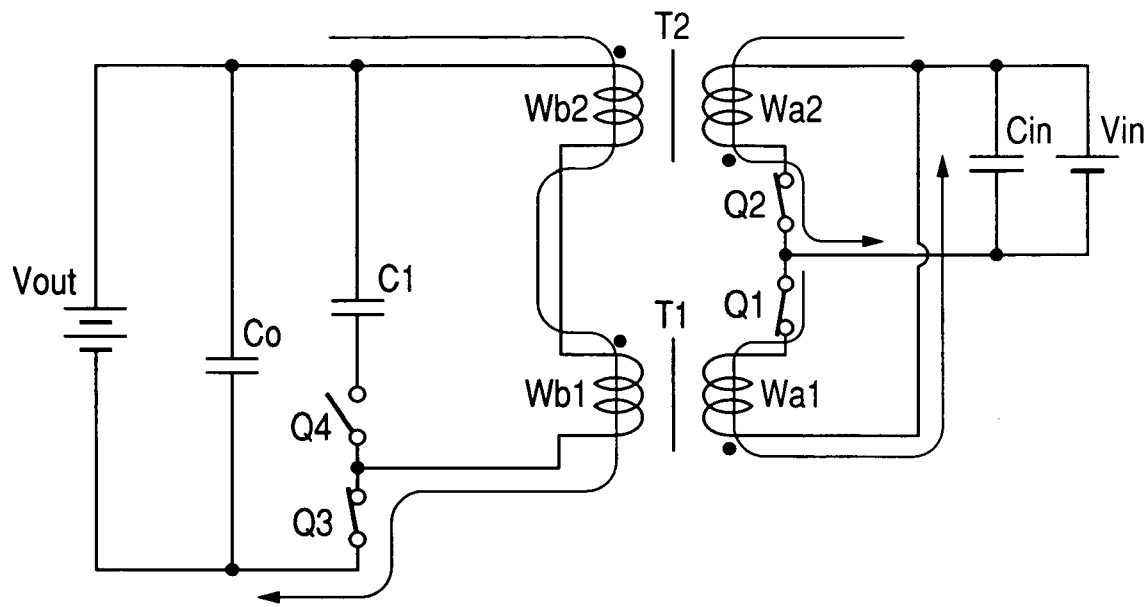

A potential difference arises between the terminals of the smoothing capacitor Co and the points A-B. Specifically, a leakage inductance of the transformers T1, T2 has an equivalent effect to an inductor connected between the smoothing capacitor Co and the windings Wb1, Wb2, with a potential difference arising between the opposing ends of the inductor. As a result, as shown in FIG. 17, the direction of current flow through the windings Wb1, Wb2 becomes reversed due to current that flows from the smoothing capacitor Co. At that time, the voltage across the smoothing capacitor Co is substantially equal to the output voltage of the No. 2 voltage system circuit 200. Hence, the current flowing in the switching element Q1 becomes rapidly reduced (see FIG. 2(e)), and soon becomes zero, as the concurrent ON state continues, and then reverses direction.

(c) Interval [t2≦t≦t3]

Figure 18:
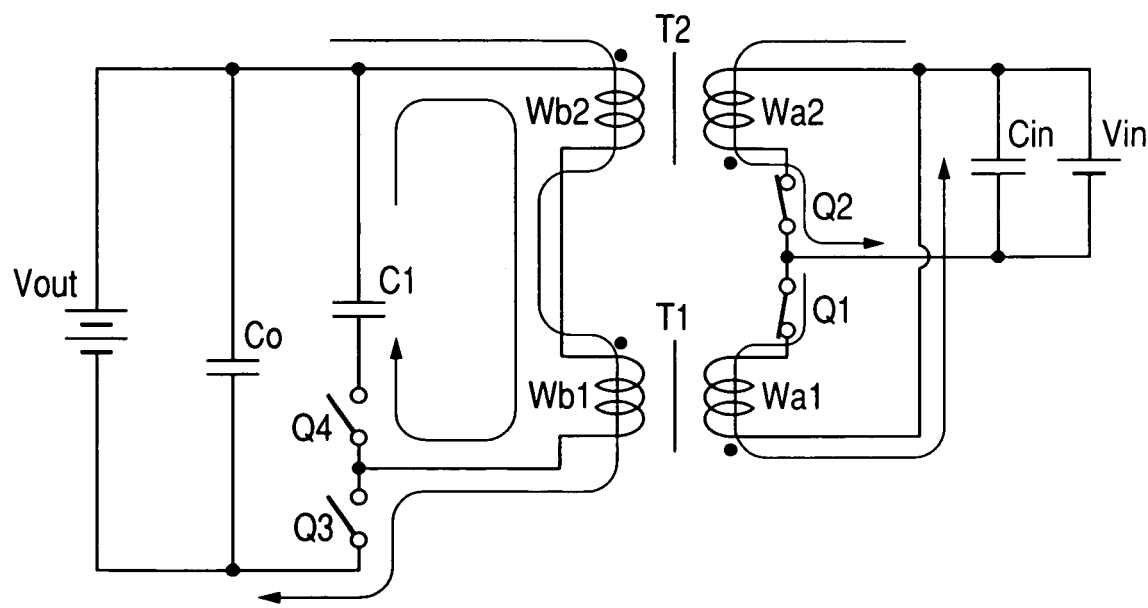

When a transition occurs from the concurrent ON state to the switch-off of switching element Q3 at time point t2, then in the No. 2 voltage system circuit 200, resonance occurs at a frequency determined by the leakage inductances of the transformers T1 and T2 and the stray capacitances of the switching elements Q3, Q4 (see FIG. 18). As a result, in the No. 1 voltage system circuit 100, the current flowing in the switching element Q1, after reaching zero and becoming reversed in direction, again becomes reduced to approximately zero by the time point t3 (see FIG. 2(e)), as described hereinabove for the first embodiment, and at that time point, switch-off of the switching element Q1 is performed. As a result, the voltage surge that is developed at switch-off of the switching element Q1 is extremely small, so that it becomes possible to implement the switching element Q1 as an inexpensive MOSFET having a low level of withstand voltage.

Furthermore, switch-off of the switching element Q1 is performed at a time point when the current flowing in that switching element has become approximately zero, so that a "soft switching" effect is achieved, enabling switching losses to be greatly reduced.

(d) Interval [t3≦t≦t5]

Figure 19:
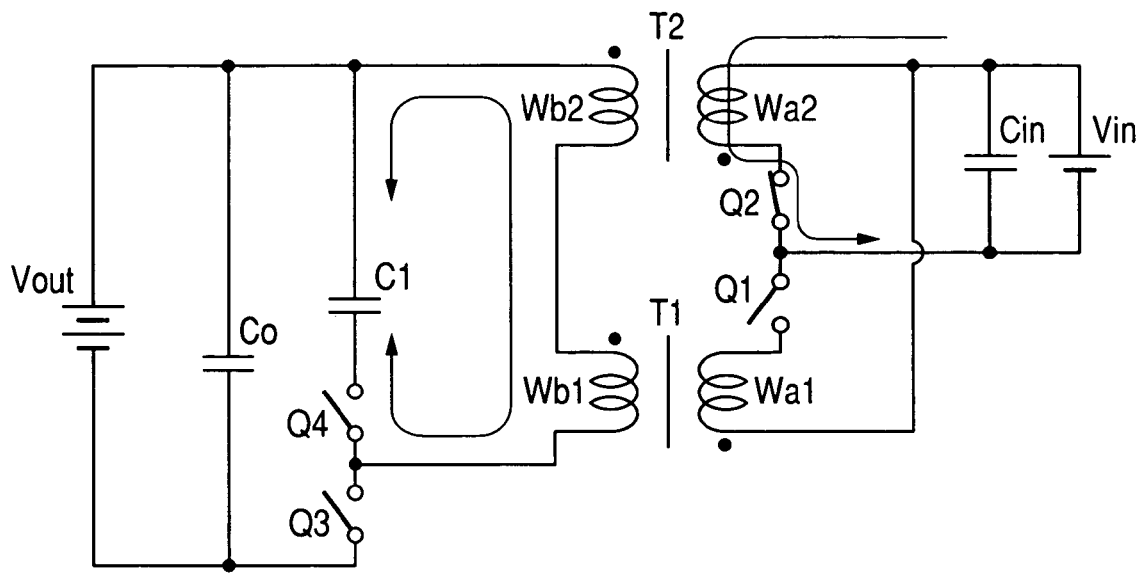
Figure 20:
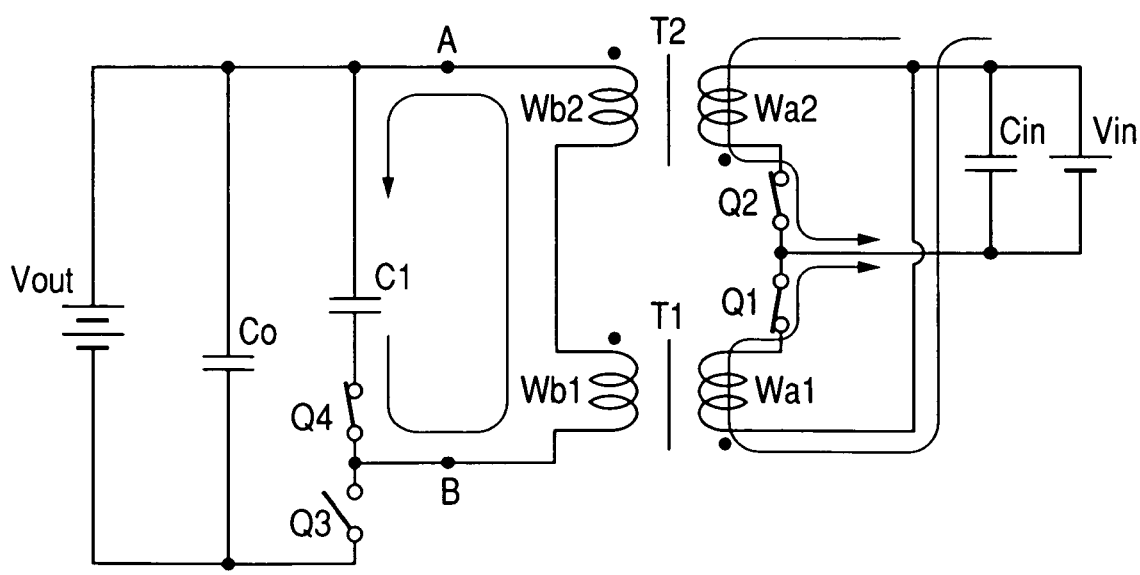

When the switching element Q1 enters the OFF state then as shown in FIG. 19, in the No. 1 voltage system circuit 100, magnetic energy becomes stored in the excitation inductance of the transformer T2 due to current that flows in a path:

No. 1 DC power source 10→winding Wa2→switching element Q2

In the No. 2 voltage system circuit 200, excitation current of the transformers T1 and T2 flows in a closed circuit formed by the active clamp circuit (constituted by the capacitor C1 and the switching element Q4) and the windings Wb1, Wb2. Due to the action of the active clamp circuit at this time, then firstly a charging current of the capacitor C1 flows (i.e., along the clockwise direction around the closed circuit, as seen in FIG. 19). Current then flows (see FIG. 2(j)) in a direction for discharging the capacitor C1 (i.e., along the anti-clockwise direction around the closed circuit, as seen in FIG. 19).

When a charging current of the capacitor C1 flows in the closed circuit, i.e., flowing through the parasitic diode of the switching element Q4 (at time point t4), transition to the No. 2 condition is executed by switch-on of the switching element Q4, so that a "soft switching" turn-on of the switching element Q4 is achieved, enabling switching losses to be greatly reduced.

(e) Interval [t5≦t≦t6]

Figure 30:
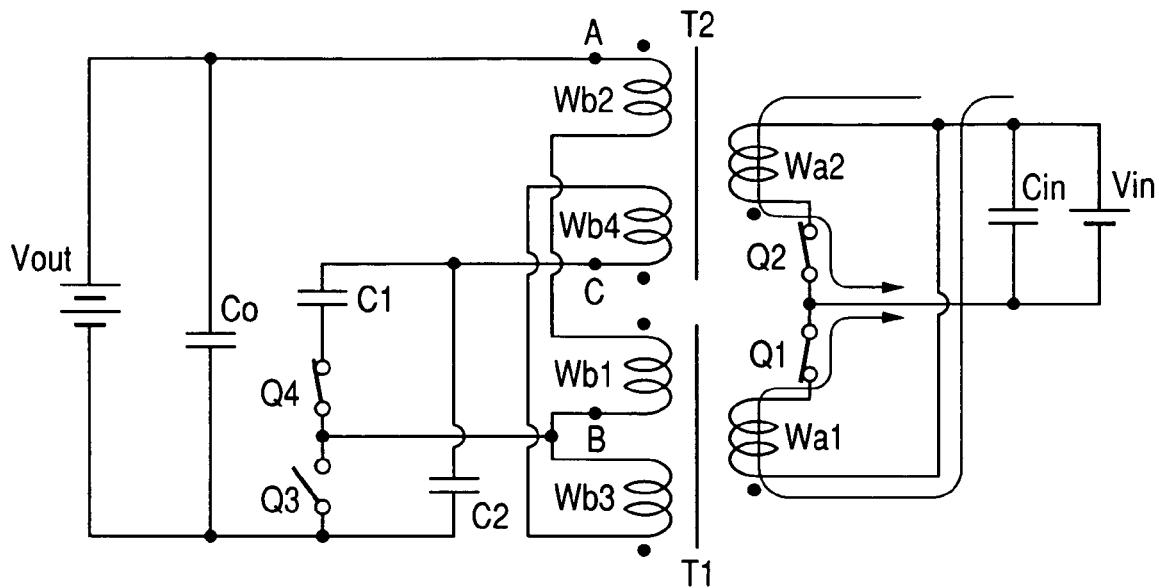

When transition is performed from the No. 2 condition to the concurrent ON state, by switch-on of the switching element Q1 at time point t5, then since at that time a voltage+Vin is applied to the winding Wa1 and a voltage−Vin is applied to the winding Wa2. Thus, the inductance between the points A-B shown in FIG. 30 is apparently the sum of the leakage inductances of the transformers T1 and T2.

Figure 21:
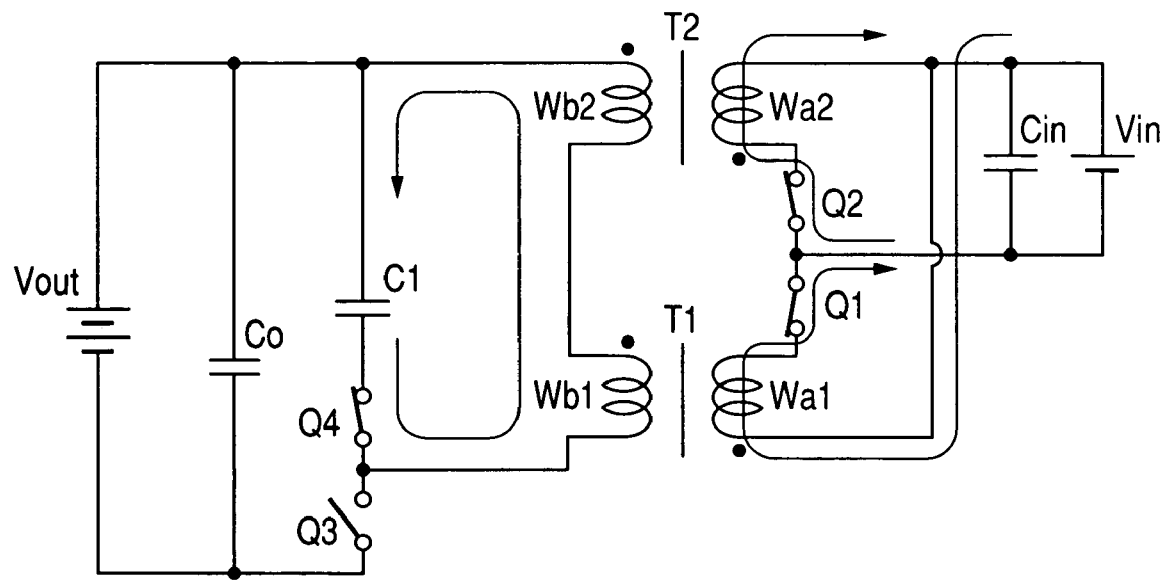

Hence, the level of current flowing in the windings Wb1, Wb2 is rapidly increased by a discharge current that flows through these windings from the capacitor C1 (see FIG. 2(i)). Thus, the current flowing in the switching element Q2 becomes rapidly reduced (see FIG. 2(f)), and soon becomes zero, then reverses direction as shown in FIG. 21.

(f) Interval [t6≦t≦t7]

Figure 22:
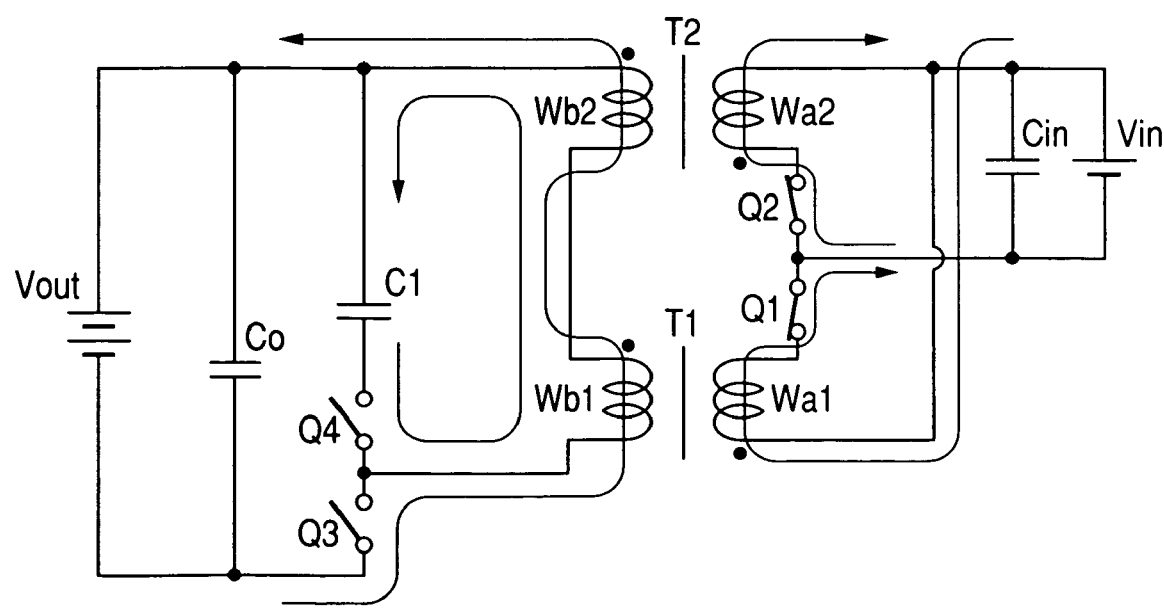

When transition is performed at time point t6 from the concurrent ON state to the condition in which the switching element Q4 is OFF, then in the No. 2 voltage system circuit 200, resonance occurs at a frequency determined by the leakage inductances of the transformers T1, T2 and the stray capacitances of the switching elements Q3, Q4 (see FIG. 22). As a result, the current flowing in the switching element Q2 of the No. 1 voltage system circuit 100 becomes approximately zero (see FIG. 2(f)).

When that occurs (at time point t7) the switching element Q2 is switched off. As a result, the voltage surge that is developed at switch-off of the switching element Q2 is extremely small, so that it becomes possible to implement the switching element Q2 as an inexpensive type of MOSFET having only a low value of withstand voltage. Furthermore, switch-off of the switching element Q2 is performed at a time point when the current flowing in that switching element has become approximately zero, so that a "soft switching" effect is achieved, enabling switching losses to be greatly reduced.

(g) Interval [t7≦t≦t8]

Figure 23:
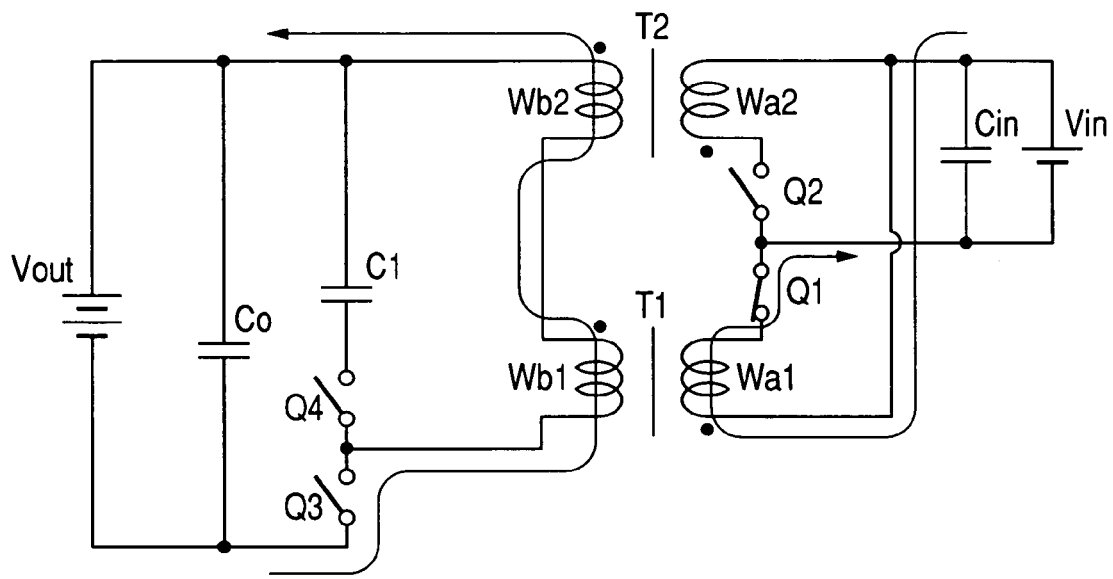

As shown in FIG. 23, in the condition in which the switching element Q1 is ON and each of the switching elements Q2, Q3, Q4 are OFF, then in the No. 1 voltage system circuit 100, current flows along a path:

No. 1 DC power source 10→winding Wa1→switching element Q1

In the No. 2 voltage system circuit 200, since the switching element Q3 is in the OFF state, current flows through the parasitic diode D of the switching element Q3 in the direction shown by the arrow, through the windings Wb1, Wb2. Hence the voltage applied to the switching element Q3 becomes close to zero (actually, becomes the forward voltage of the parasitic diode D). Thereafter, the switching element Q3 is switched on at time point t8 (=t0), and the No. 1 condition is returned to. Since switch-on of the switching element Q3 is performed at a time point when the applied voltage is approximately zero, a "soft switching" effect is achieved, enabling switching losses to be greatly reduced.

Furthermore, since synchronous rectification is effected by the switch-on of the switching element Q3, high efficiency is achieved.

The above sequence of operations (a) to (g) is cyclically repeated.

Effects of the Third Embodiment

With the third embodiment controlled as described above, as for the first embodiment, when transition occurs from the No. 1 condition to the No. 2 condition, the switching element Q2 is switched on before the switching elements Q1, Q3 are switched off. Switch-off of the current flowing in the switching element Q1 is performed when the level of that current is close to zero. Hence, only a small level of voltage surge is developed across the switching element Q1, and the logical value of that voltage surge can be zero.

Similarly, when transition occurs from the No. 2 condition to the No. 1 condition, then before switch-off of the switching elements Q2 and Q4 is performed, the switching element Q1 is switched on, to establish the concurrent ON state. Thus the switching element Q2 can be switched off at a time point when the current flowing in that switching element has become approximately zero. Hence, only a small level of voltage surge is developed across the switching element Q1 at the time of switch-off, and the logical value of that voltage surge can be made zero.

Fourth Embodiment

Figure 24:
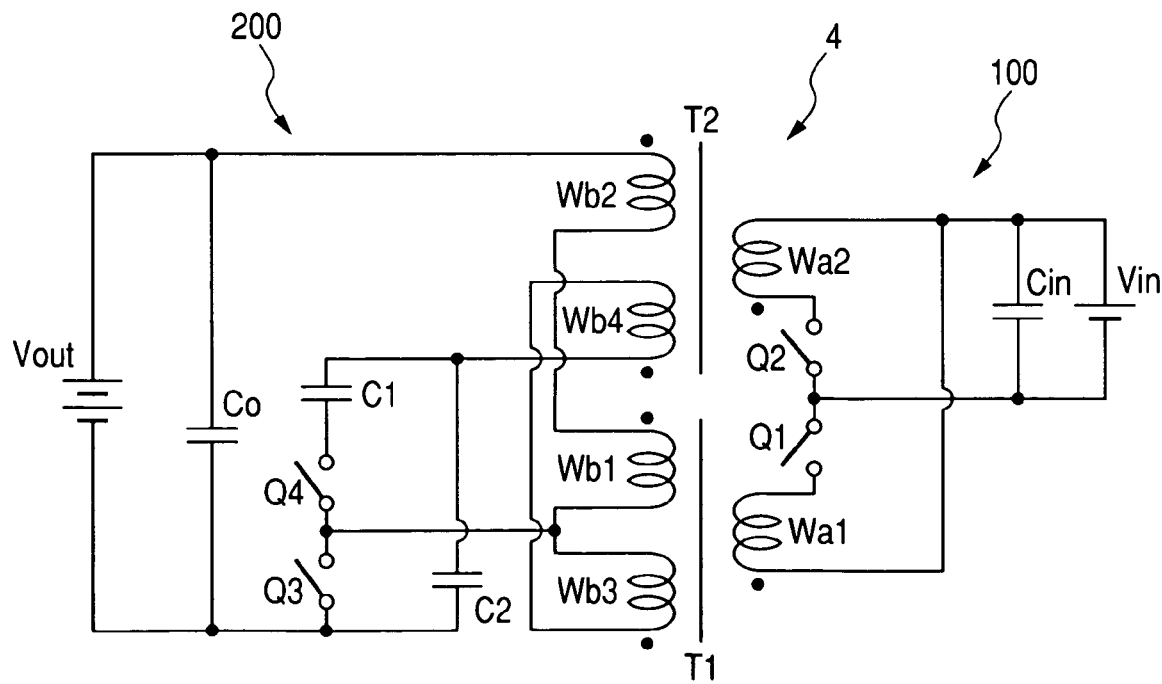
FIG. 24 is a circuit diagram of a fourth embodiment of a DC-to-DC converter.

FIG. 24 shows a fourth embodiment of a DC-to-DC converter, designated by numeral 4. This embodiment utilizes two transformers T1, T2, and differs from the third embodiment with respect to circuit configuration of the output side (circuit 200).

Specifically, as shown in FIG. 24, the transformer T1 has windings Wb1, Wb3 connected to the No. 2 voltage system circuit 200, while the transformer T2 has windings Wb2, Wb4 connected to the No. 2 voltage system circuit 200,. The windings Wb2, Wb1 are connected in series, and also the winding Wb3, Wb4 are connected in series, with one end of the winding Wb2 connected to the high-potential side of the smoothing capacitor Co, a junction of the windings Wb1, Wb3 connected to the junction of the switching elements Q3, Q4, and one end of the winding Wb4 connected to one terminal of the capacitor C2, whose other terminal is connected to the junction between the low-potential side of the smoothing capacitor Co and the switching element Q3.

The active clamp circuit formed by the series-connected capacitor C1 and switching element Q4 is connected between one end of the winding Wb4 and the junction of the windings Wb1, Wb3, and so is connected in parallel with the series-connected windings Wb3, Wb4. However it would also be possible to connect the active clamp circuit across the series-connected windings Wb1, Wb2.

The operation whereby power conversion is performed from the No. 1 voltage system circuit 100 to the No. 2 voltage system circuit 200 will be described referring to the timing diagram of FIG. 25, and to the circuit diagrams of FIGS. 26 to 32, which illustrate flows of current within the circuit during respective time intervals shown in FIG. 25.

Figure 25:
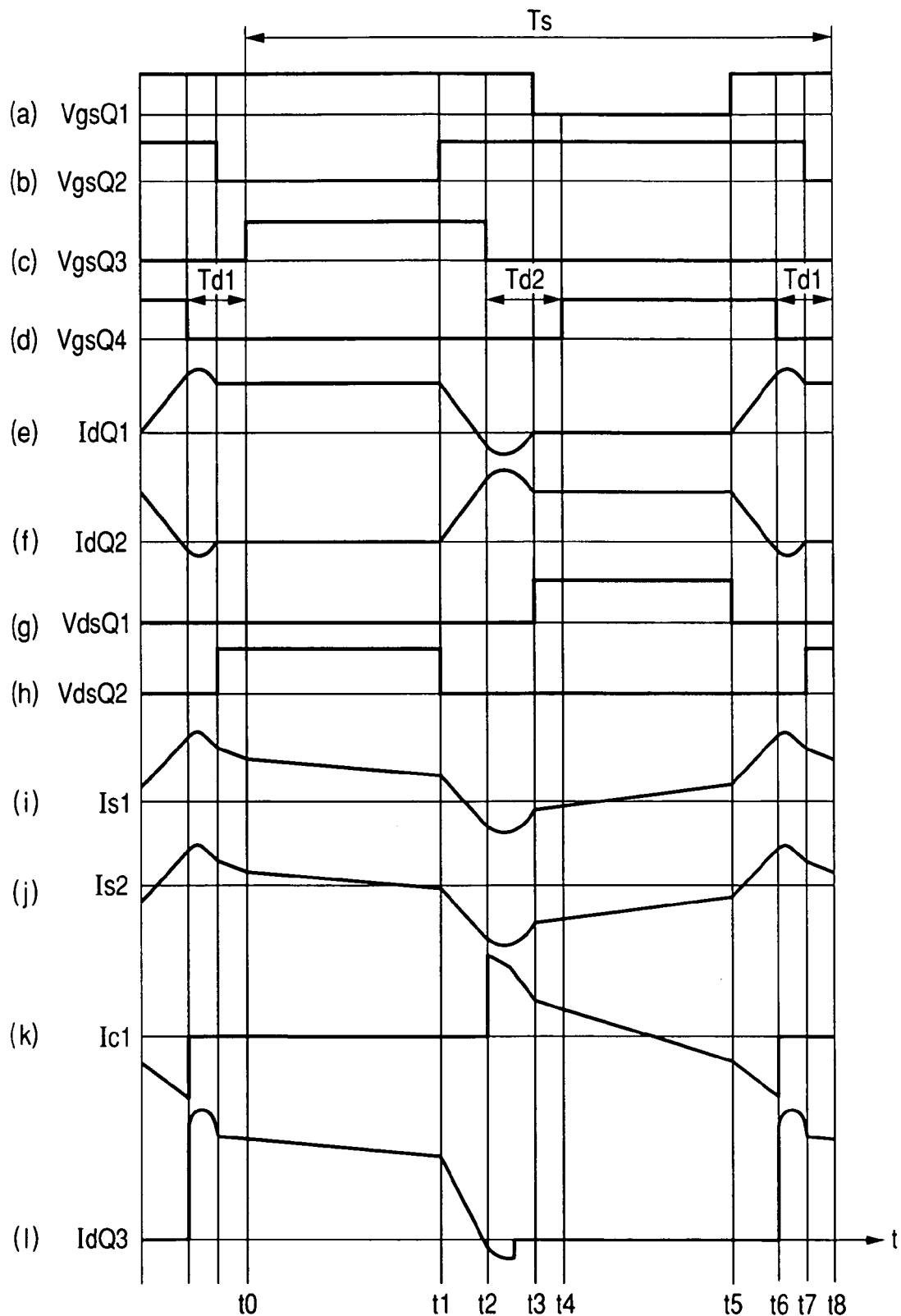
FIG. 25 is a timing diagram for describing the operation of the fourth embodiment.

FIGS. 25($a$) to 25($d$) show the respective gate voltages applied to the switching elements Q1 to Q4, with each switching element being switched on when the corresponding gate voltage goes to the high level, and switched off when the corresponding gate voltage goes to the low level.

FIGS. 25($e$), 25($f$) show the respective drain currents of the switching elements Q1, Q2, with positive values representing levels of current flow in the drain to source direction. FIGS. 25($g$), 25($h$) show the respective drain-to-source voltages of the switching elements Q1, Q2. FIG. 25($i$) shows current that flows in the windings Wb1, Wb2, with positive values corresponding to flow in the upward direction, as seen in the circuit diagrams. FIG. 25($j$) shows current that flows in the windings Wb3, Wb4, with positive values corresponding to flow in the downward direction for the winding Wb3, as seen in the circuit diagrams. FIG. 25($k$) shows current that flows in the capacitor C1, with positive values representing levels of current flow in the upward direction, as shown in the circuit diagrams. FIG. 25($l$) shows drain current that flows in the switching element Q3, with positive values representing flows in the source to drain direction.

The designations Td1, Td2 in FIG. 25($d$) indicate dead times, in which transition is performed between the on and OFF states of the switching elements Q3, Q4, i.e., intervals in which both of the switching elements Q3, Q4 are concurrently in the OFF state. With the present invention, these dead times are essential.

(a) Interval [t0≦t≦t1]

Figure 26:
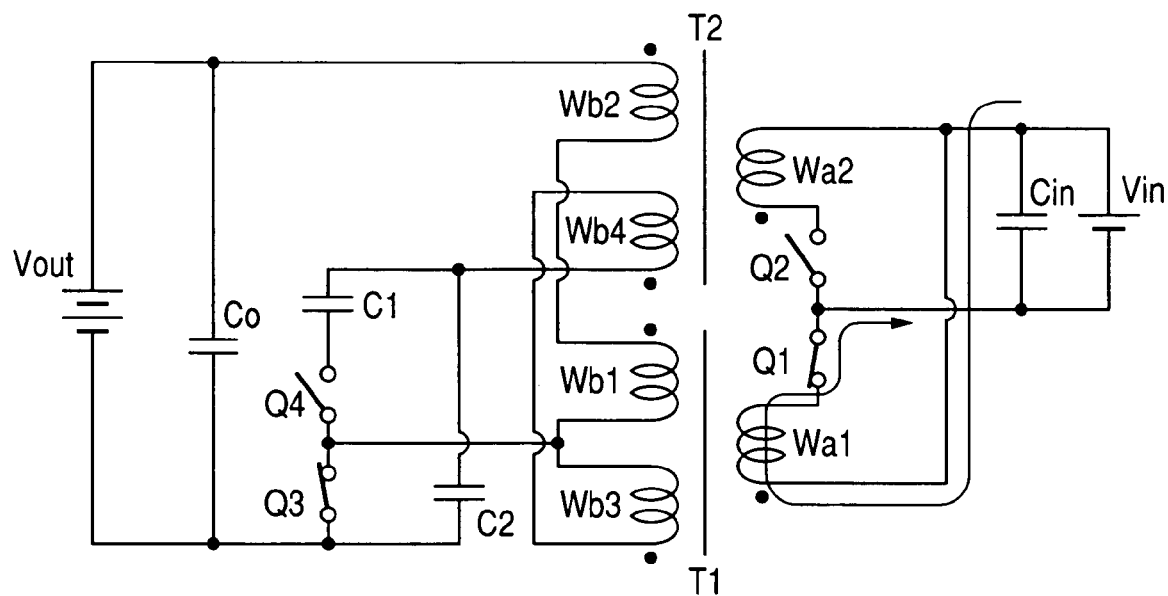
FIGS. 26 to 32 are circuit diagrams for describing current flows within the fourth embodiment during respective time intervals.

As shown in FIG. 26, during this interval the switching elements Q1, Q3 are set ON, while switching elements Q2 and Q4 are set OFF, i.e., the No. 1 condition is established. Hence in the No. 1 voltage system circuit 100, current flows in the direction:

No. 1 DC power source 10→winding Wa1→switching element Q1.

As a result, the power of the No. 1 DC power source 10 is transferred by the transformer T1 to the No. 2 voltage system circuit 200. In addition, magnetic energy becomes stored in the transformer T1, while magnetic energy stored in the transformer T2 is transferred to the No. 2 voltage system circuit 200.

(b) Interval [t1≦t≦t2]

Figure 27:
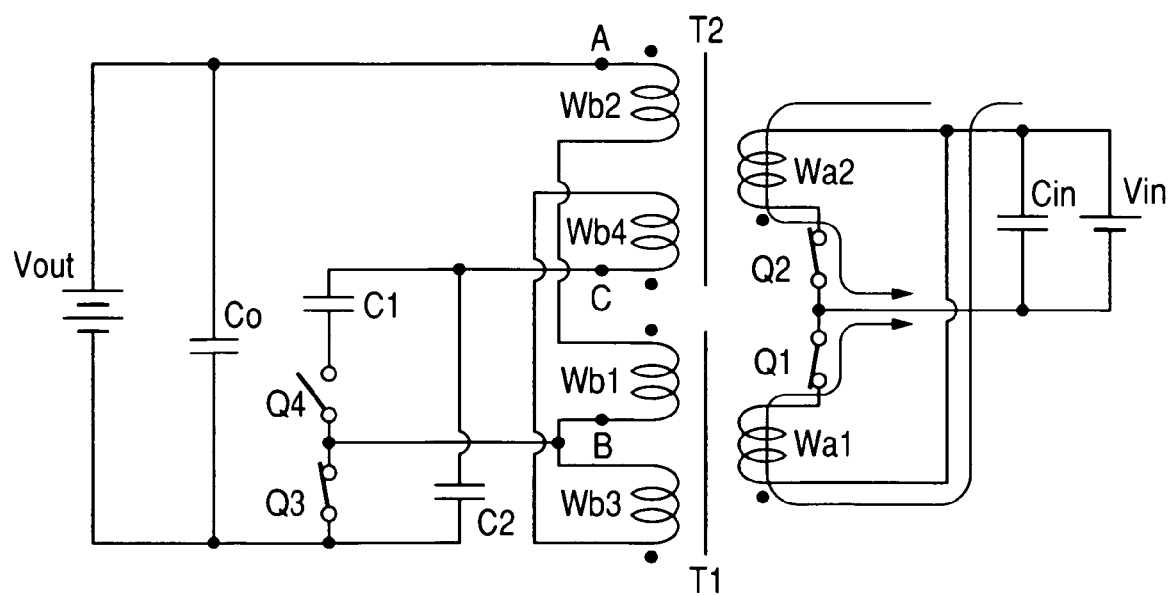

When the switching element Q2 is switched on, at time point t1 (so that a change occurs from the No. 1 condition to the concurrent ON condition), a voltage +Vin is applied to the winding Wa1, and a voltage −Vin is applied to the winding Wa2. The inductance between the points A-B and between the points B-C shown in FIG. 27 is apparently the sum of the leakage inductances of the transformers T1 and T2.

Figure 28:
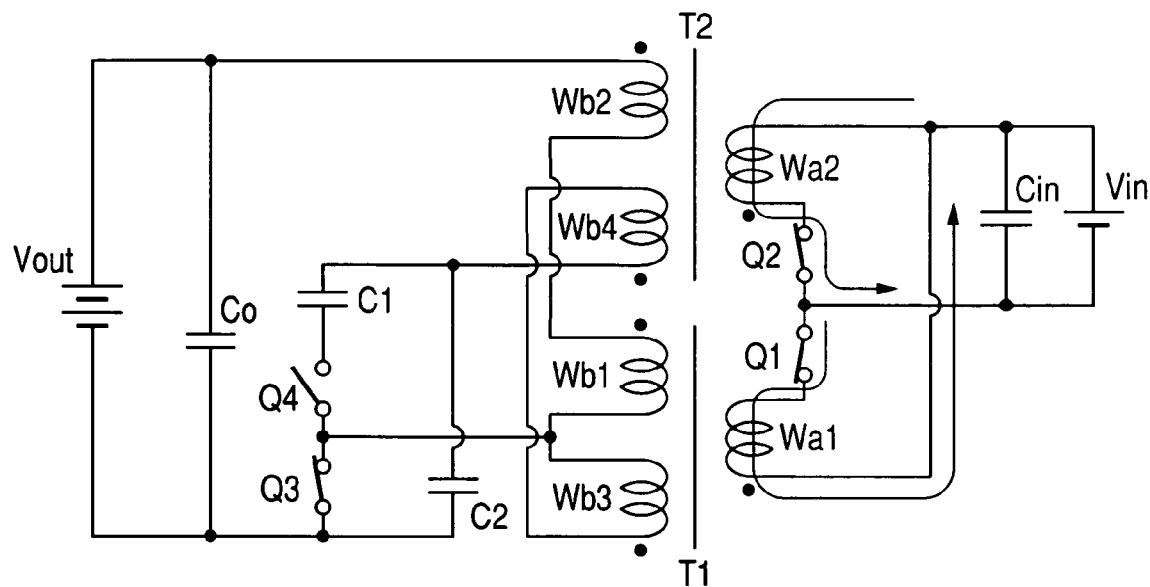

As a result, as shown in FIG. 25($i$), a discharge current flows from the smoothing capacitor Co through the winding Wb1, Wb2, causing the direction of current flow through these to become reversed. At that time, the voltage across the smoothing capacitor Co is approximately equal to the output voltage of the No. 2 voltage system circuit 200. When the direction of current flow through the windings Wb1, Wb2 becomes reversed, the current flowing in the switching element Q1 becomes rapidly reduced (see FIG. 25($e$)), and soon becomes zero, then reverses direction as shown in FIG. 28.

(c) Interval [t2≦t≦t3]

When a transition occurs from the concurrent ON state to the switch-off of switching element Q3 at time point t2, then in the No. 2 voltage system circuit 200, resonance occurs at a frequency determined by the leakage inductances of the transformers T1 and T2 and the stray capacitances of the switching elements Q3, Q4. As a result, in the No. 1 voltage system circuit 100, the current flowing in the switching element Q1 becomes reduced to approximately zero (see FIG. 25($e$)) at the time point t3 when the switching element Q1 is switched off. As a result, the voltage surge that is developed at switch-off of the switching element Q1 is extremely small, so that it becomes possible to implement the switching element Q1 as an inexpensive MOSFET having a low level of withstand voltage.

Furthermore, switch-off of the switching element Q1 is performed at a time point when the current flowing in that switching element has become approximately zero, so that a "soft switching" effect is achieved, enabling switching losses to be greatly reduced.

(d) Interval [t3≦t≦t5]

Figure 29:
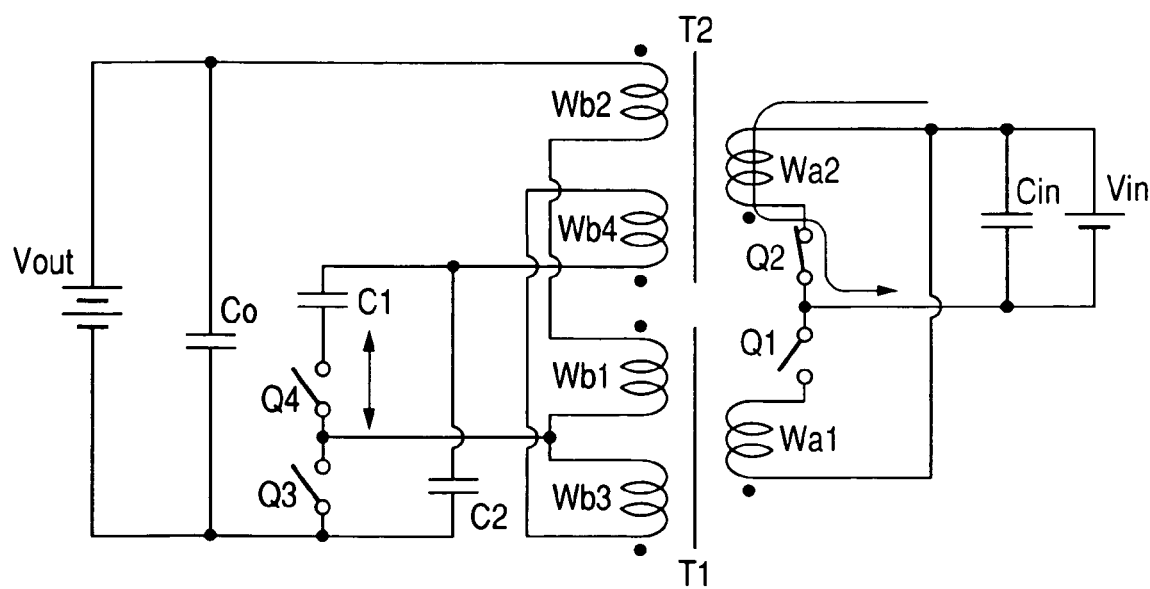

When the switching element Q1 enters the OFF state then as shown in FIG. 29, in the No. 1 voltage system circuit 100, magnetic energy becomes stored in the excitation inductance of the transformer T2 due to current that flows from the No. 1 DC power source and through the winding Wa2 and switching element Q2 in succession.

In the No. 2 voltage system circuit 200, excitation current of the transformers T1 and T2 flows in the active clamp circuit (constituted by the capacitor C1 and the switching element Q4). Due to the action of the active clamp circuit at this time, then firstly a charging current of the capacitor C1 flows (i.e., along the upward direction, as seen in FIG. 29). Current then flows (see FIG. 2($j$)) in a direction for discharging the capacitor C1 (i.e., along the downward direction, as seen in FIG. 29).

When a charging current of the capacitor C1 flows in the closed circuit, i.e., flowing through the parasitic diode of the switching element Q4 (at time point t4), transition to the No. 2 condition is executed by switch-on of the switching element Q4, so that a "soft switching" turn-on of the switching element Q4 is achieved, enabling switching losses to be greatly reduced.

(e) Interval [t5≦t≦t6]

When transition is performed from the No. 2 condition to the concurrent ON state, by switch-on of the switching element Q1 at time point t5, a voltage+Vin becomes applied to the winding Wa1 and a voltage−Vin is applied to the winding Wa2. Thus, the inductance between each of the pairs of points A-B and B-C in FIG. 30 is apparently the sum of the leakage inductances of the transformers T1 and T2.

Figure 31:
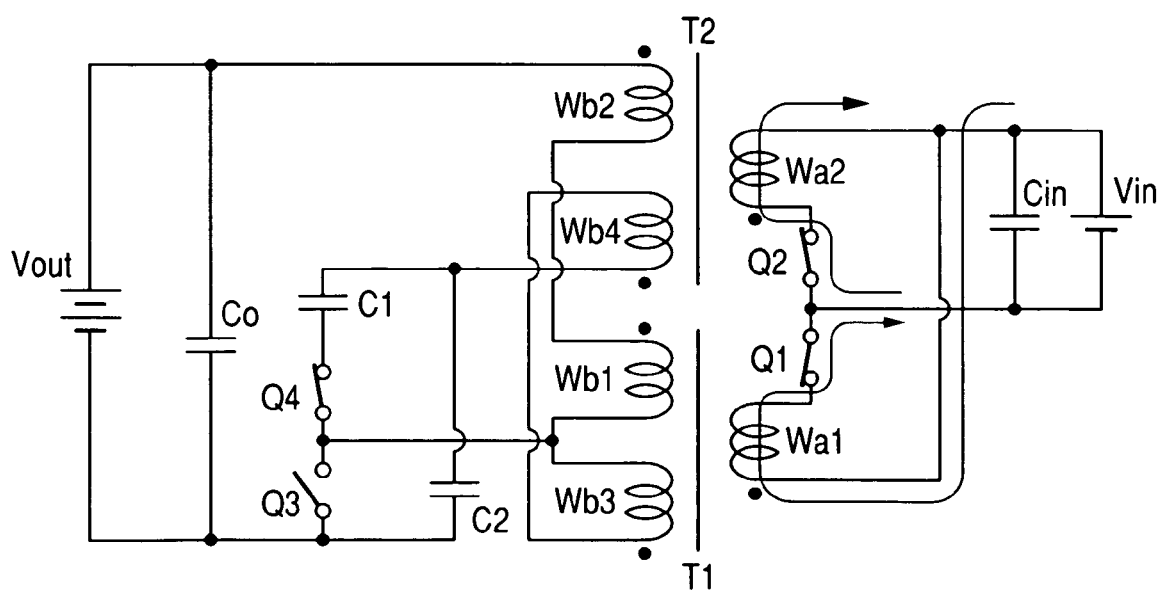

As a result, when the charge stored in the capacitor C1 becomes discharged, the level of current flowing in the windings Wb1, Wb2 is rapidly increased (see FIG. 25(i)). Thus, the current flowing in the switching element Q2 becomes rapidly reduced (see FIG. 25(f)), and as the concurrent ON state continues, soon becomes zero, then reverses direction, as shown in FIG. 31.

(f) Interval [t6≦t≦t7]

When transition is performed at time point t6 from the concurrent ON state to the condition in which the switching element Q4 is OFF, then in the No. 2 voltage system circuit 200, resonance occurs at a frequency determined by the leakage inductances of the transformers T1, T2 and the stray capacitances of the switching elements Q3, Q4. As a result, the current flowing in the switching element Q2 becomes approximately zero by time point t7, when switch-off of the switching element Q2 is performed (see FIG. 25(f)). As a result, the voltage surge that is developed at switch-off is extremely small, so that it becomes possible to implement the switching element Q2 as an inexpensive type of MOSFET having only a low value of withstand voltage. Furthermore, since switch-off of the switching element Q2 is performed at a time point when the current flowing in that switching element has become approximately zero, a "soft switching" effect is achieved, enabling switching losses to be greatly reduced.

(g) Interval [t7≦t≦t8]

Figure 32:
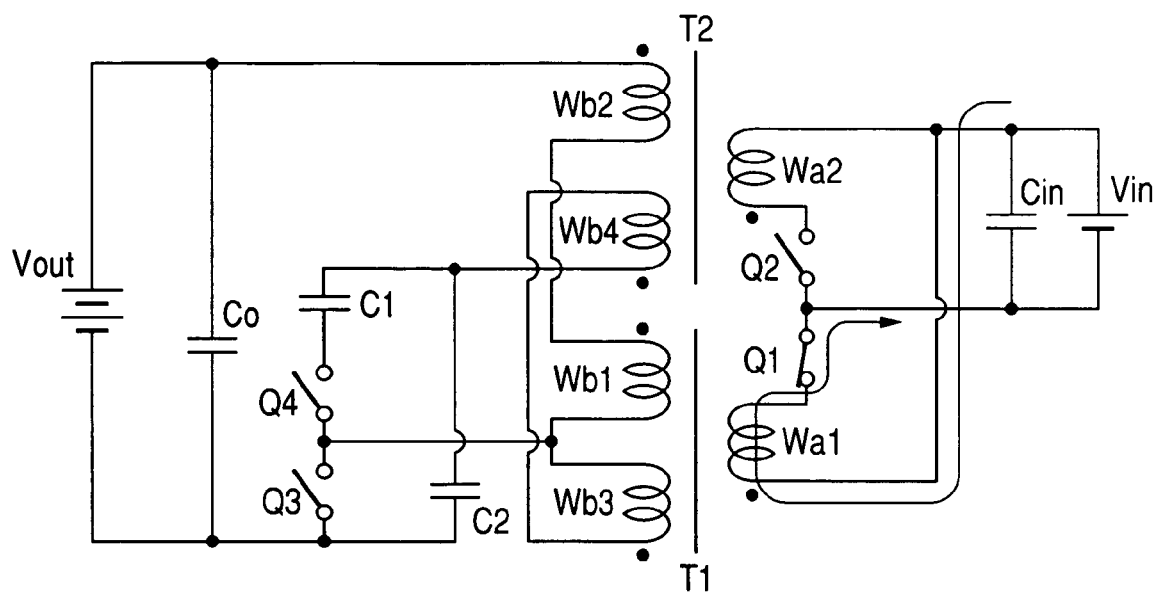
Figure 33:
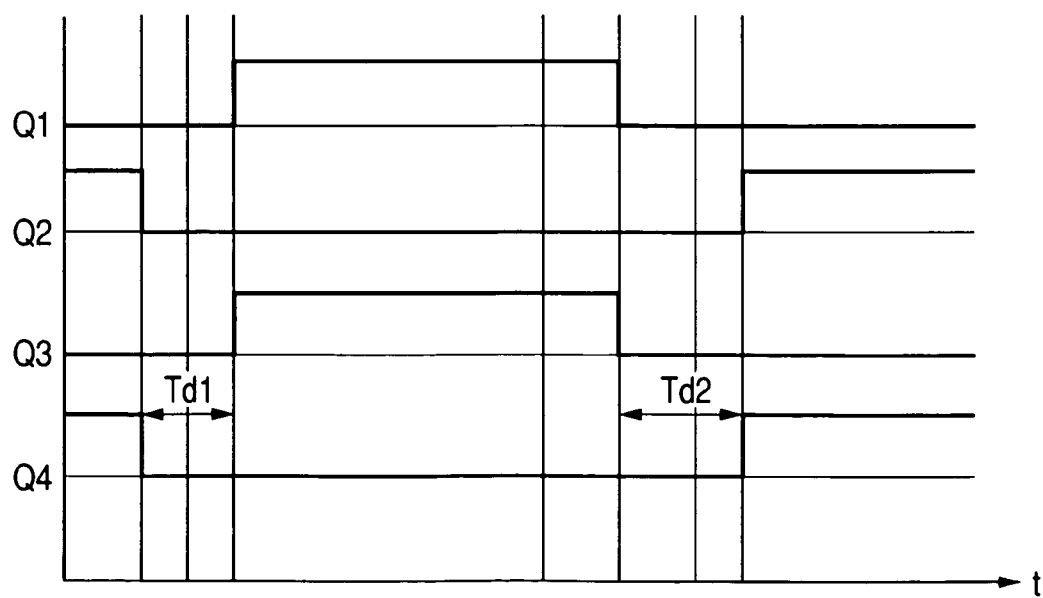
FIG. 33 is a circuit diagram of a prior art example of a gate control sequence which could be applied to the first embodiment.

As shown in FIG. 32, in the condition in which the switching element Q1 is ON and each of the switching elements Q2, Q3, Q4 are OFF, then in the No. 1 voltage system circuit 100, current flows along a path from DC power source 10 through the winding Wa1 and the switching element Q1 in succession.

In the No. 2 voltage system circuit 200, since the switching element Q3 is in the OFF state, current flows through the parasitic diode D of the switching element Q3. Hence the voltage applied to the switching element Q3 becomes close to zero (actually, becomes the forward voltage of the parasitic diode D).

Thereafter, the switching element Q3 is switched on at time point t8 (=t0), and the No. 1 condition is returned to. Since switch-on of the switching element Q3 is performed at a time point when the applied voltage is approximately zero, a "soft switching" effect is achieved, enabling switching losses to be greatly reduced.

Furthermore, since synchronous rectification is effected by the switch-on of the switching element Q3, high efficiency is achieved.

The above sequence of operations (a) to (g) is cyclically repeated.

With the fourth embodiment controlled as described above, as for the first embodiment, when transition occurs from the No. 1 condition to the No. 2 condition, the switching element Q2 is switched on before the switching elements Q1, Q3 are switched off. Switch-off of the current flowing in the switching element Q1 is performed when the level of that current is close to zero. Hence, only a small level of voltage surge is developed across the switching element Q1, and the logical value of that voltage surge can be zero.

Similarly, when transition occurs from the No. 2 condition to the No. 1 condition, then before switch-off of the switching elements Q2 and Q4 is performed, the switching element Q1 is switched on, to establish the concurrent ON state. The switching element Q2 is thereafter switched off at a time point when the current flowing through it is close to zero. Hence, only a small level of voltage surge is developed across the switching element Q1 at the time of switch-off, and the logical value of that voltage surge can be made zero.

Alternative Embodiments

With the first embodiment, respective MOSFETs are used as the switching elements Q3, Q4. However it would be equally possible to use other types of semiconductor devices such as bipolar transistors, etc., to form these switching elements. However if another type of semiconductor device is utilized, which does not have a parasitic diode, then it becomes necessary to connect an external diode across the semiconductor device.

It should also be noted that this also applies to each of the semiconductor devices used to form the switching elements Q1 to Q4 in each of the first to fourth embodiments, since (although not specifically described in the above) the invention also makes use of respective parasitic diodes of the switching elements Q1, Q2, when they are implemented as MOSFETs. Hence for each of these, if a semiconductor device which does not have a parasitic diode is utilized to form the switching element, an external diode is preferably connected across the semiconductor device.

With the first through fourth embodiments, when transition is performed from the concurrent ON state to the condition in which the switching element Q1 is switched off, the current flowing in the switching element Q1 rapidly is reduced to zero, thereafter reverses in direction, then again is reduced to zero, and switch-off of the switching element Q1 is performed at approximately the second time that the current has become reduced to zero. However it would be equally possible to perform switch-off of the switching element Q1 the first time that the current falls to zero, or, as described above, at a time when the direction of current flow through that switching element has become reversed after having first fallen to zero.

In particular, when a parasitic diode or an externally connected diode is in parallel with the switching element Q1 (i.e., connected with appropriate polarity to become forward-biased when the current flow direction through the switching element becomes reversed and the switching element is turned off), switch-off of the switching element Q1 can be performed when the current flow direction has become reversed, since in that condition, current will begin to flow through the diode when the switching element Q1 is switched off. Thus almost no voltage surge will be produced at that time (i.e., only the forward voltage drop of the parasitic diode will occur) at switch-off, and only a small value of voltage surge will be produced if the diode subsequently becomes reverse-biased (i.e., if a low level of forward direction current flows after the current has fallen to zero after having become reversed). Thus in this case too, effective voltage surge suppression can be achieved.

In the timing diagrams of FIGS. 2 and 25, when transition is performed from the No. 1 condition to the No. 2 condition, the switching element Q1 is shown as being switched off at time point t3, after the switching element Q3 has been switched off at time point t2. However it would be equally possible to perform these operations in the reverse sequence. That is to say, the switching element Q1 could be switched off at time point t2, then the switching element Q3 switched off at time point t3.

As a further alternative, it would be possible to perform switch-off of both of the switching elements Q1, Q3 concurrently (i.e., t2=t3).

Similarly, when transition is performed from the No. 2 condition to the No. 1 condition, the switching element Q2 could be switched off at time point t6, then the switching element Q4 switched off at time point t7. Alternatively, it would be possible to perform switch-off of both of the switching elements Q2, Q4 concurrently (i.e., t6=t7).

Furthermore, in place of utilizing leakage inductances of the transformers T1, T2 as described for the intervals [t1≦t≦t2], [t2≦t≦t3], [t5≦t≦t6], [t6≦t≦t7], it would be equally possible to connect a resonance coil in series with the transformers T1, T2, to provide the effects described for the leakage inductances.

What is claimed is:

1. A method of controlling a DC-to-DC converter by operation of a switching control circuit, said DC-to-DC converter comprising
   a first voltage system circuit comprising a first switching element and a second switching element,
   a second voltage system circuit comprising a third switching element and a fourth switching element,
   electric power conversion means for performing electrical power conversion between said first voltage system circuit and said second voltage system circuit, and
   said switching control circuit, adapted to perform complementary on/off switching of said first switching element and said second switching element, and to perform complementary on/off switching of said third switching element and said fourth switching element, synchronized with said switching of said first and third switching elements,
   wherein designating a condition in which both of said first and third switching elements are in an ON state and said second and fourth switching elements are in an OFF state as a No. 1 condition, and designating a condition in which both of said first and third switching elements are in the OFF state and said second and fourth switching elements are in the ON state as a No. 2 condition, said method comprises:
   while said electrical power conversion is being performed from said first voltage system circuit to said second voltage system circuit via said electric power conversion means, cyclically performing a sequence of operations whereby following each occasion when said No. 1 condition is established, said second switching element is switched to the ON state to thereby establish a concurrent ON state in which each of said first switching element, second switching element and third switching element are in the ON state, with said switch-on of said second switching element being performed prior to performing switch-off of each of said first switching element and of said third switching element to establish said No. 2 condition.

2. A method of controlling a DC-to-DC converter according to claim 1, wherein after transition has been performed from said No. 1 condition to said concurrent ON state, said switching control circuit performs switch-off of said first switching element, to effect transition to said No. 2 condition, at a time point when a level of current flowing in said first switching element has become substantially equal to zero.

3. A method of controlling a DC-to-DC converter according to claim 1, wherein after transition has been performed from said No. 1 condition to said concurrent ON state, said switching control circuit performs switch-off of said first switching element, to effect transition to said No. 2 condition, at a time point when a level of current flowing in said first switching element has become substantially equal to zero or when a direction of said current has become reversed.

4. A method of controlling a DC-to-DC converter according to claim 1, wherein said first switching element is connected in parallel with a diode, and wherein after transition from said No. 1 condition to said concurrent ON state has been performed, said switching control circuit performs switch-off of said first switching element, to establish said No. 2 condition, at a time point when a level of current flowing in said first switching element has become substantially equal to zero or when a direction of flow of said current has become reversed.

5. A method of controlling a DC-to-DC converter according to claim 4, wherein said first switching element is a semiconductor device, and wherein said diode is a parasitic diode that is intrinsic to said semiconductor device.

6. A method of controlling a DC-to-DC converter according to claim 1, wherein
   said electric power conversion means comprises a transformer having a first winding that is connected to said first voltage system circuit and a second winding that is connected to said second voltage system circuit,
   said first voltage system circuit is configured to apply a short-circuit across said first winding under a condition in which both of said first switching element and said second switching element are concurrently in the ON state,
   said second voltage system circuit comprises an active clamp circuit formed of a fourth switching element and a first capacitor connected in series, with said active clamp circuit being connected in parallel with one of said second winding and said third switching element, said second voltage system circuit further comprising current supply means connected to said second winding,
   wherein, when electrical power conversion is being performed from said first voltage system circuit to said second voltage system circuit, and transition is performed from said No. 1 condition to said concurrent ON state, said current supply means supplies a current to said second winding, with said current flowing in a direction that is the reverse of a direction of current flowing in said second winding prior to switch-on of said second switching element at initiation of said concurrent ON state;
   whereby after said switching control circuit effects said transition from said No. 1 condition to said concurrent ON state, a level of current flowing in said first switching element becomes rapidly reduced as result of said flow of reverse direction current through said second winding.

7. A method of controlling a DC-to-DC converter according to claim 6, wherein said current supply means comprises a smoothing capacitor of said second voltage system circuit.

8. A method of controlling a DC-to-DC converter according to claim 6, wherein after transition has been performed from said No. 1 condition to said concurrent ON state, said switching control circuit performs switch-off of said first switching element to effect transition to said No. 2 condition at a time point when a level of current flowing in said first switching element has become substantially equal to zero.

9. A method of controlling a DC-to-DC converter according to claim 6, wherein after transition has been performed from said No. 1 condition to said concurrent ON state, said switching control circuit performs switch-off of said first switching element, to effect transition to said No. 2 condition, at a time point when a level of current flowing in said first switching element has become substantially equal to zero or when a direction of said current has become reversed.

10. A method of controlling a DC-to-DC converter according to claim 6, wherein said first switching element is connected in parallel with a diode, and wherein after transition from said No. 1 condition to said concurrent ON state has been performed, said switching control circuit performs switch-off of said first switching element, to establish said No. 2 condition, at a time point when a level of current flowing in said first switching element has become substantially equal to zero or when a direction of flow of said current has become reversed.

11. A method of controlling a DC-to-DC converter according to claim 10, wherein said first switching element comprises a semiconductor device, and wherein said diode is a parasitic diode that is intrinsic to said semiconductor device.

12. A method of controlling a DC-to-DC converter according to claim 1, wherein
said electric power conversion means comprises a transformer having a first winding connected to said first voltage system circuit and a second winding and third winding connected to said second voltage system circuit,
said first voltage system circuit is configured to apply a short-circuit across said first winding under a condition in which both of said first switching element and said second switching element are concurrently in the ON state,
said second voltage system circuit comprises an active clamp circuit formed of a fourth switching element and a first capacitor connected in series, with said active clamp circuit being connected in parallel with one of said second winding, said third winding and said third switching element, said second voltage system circuit further comprising a closed circuit which is formed by said third winding, said third switching element and a second capacitor, and current supply means connected to said second winding,
wherein, when electrical power conversion is being performed from said first voltage system circuit to said second voltage system circuit, and transition is performed from said No. 1 condition to said concurrent ON state, said current supply means supplies a current to said second winding, with said current flowing in a direction that is the reverse of a direction of current flowing in said second winding prior to switch-on of said second switching element at initiation of said concurrent ON state;
whereby when said switching control circuit effects said transition from said No. 1 condition to said concurrent ON state, a current flowing in said first switching element becomes rapidly reduced as result of said reversal of direction of current flow through said second winding.

13. A method of controlling a DC-to-DC converter according to claim 12, wherein after transition has been performed from said No. 1 condition to said concurrent ON state, said switching control circuit performs switch-off of said first switching element to effect transition to said No. 2 condition at a time point when a level of current flowing in said first switching element has become substantially equal to zero.

14. A method of controlling a DC-to-DC converter according to claim 12, wherein after transition has been performed from said No. 1 condition to said concurrent ON state, said switching control circuit performs switch-off of said first switching element, to effect transition to said No. 2 condition, at a time point when a level of current flowing in said first switching element has become substantially equal to zero or when a direction of said current has become reversed.

15. A method of controlling a DC-to-DC converter according to claim 12, wherein said first switching is connected in parallel with a diode, and wherein after transition from said No. 1 condition to said concurrent ON state has been performed, said switching control circuit performs switch-off of said first switching element, to establish said No. 2 condition, at a time point when a level of current flowing in said first switching element has become substantially equal to zero or when a direction of flow of said current has become reversed.

16. A method of controlling a DC-to-DC converter according to claim 12, wherein said first switching element comprises a semiconductor device, and wherein said diode is a parasitic diode that is intrinsic to said semiconductor device.

17. A method of controlling a DC-to-DC converter according to claim 1, wherein
said electric power conversion means comprises a first transformer having a first winding connected in series with said first switching element and a second winding connected to said second voltage system circuit, and a second transformer having a first winding connected in series with said second switching element and a second winding connected to said second voltage system circuit, with said second winding of said first transformer and second winding of said second transformer being connected in series,
said first voltage system circuit is configured with a closed circuit formed by said series-connected first winding of said first transformer and first switching element and said series-connected first winding of said second transformer and said second switching element,
said second voltage system circuit comprises an active clamp circuit that is formed of a fourth switching element and a first capacitor connected in series and is connected in parallel with one of said series-connected winding of said first transformer and second winding of said second transformer, and said third switching element, and current supply means connected to said series-connected second winding of said first transformer and second winding of said second transformer,
wherein when electrical power conversion is being performed from said first voltage system circuit to said second voltage system circuit, each time that transition is performed from said No. 1 condition to said concurrent ON state, said current supply means supplies a current to said second winding of said first transformer and second winding of said second transformer, with said current flowing in a direction that is the reverse of a direction of current flowing in said second winding of said first transformer and second winding of said second transformer prior to switch-on of said second switching element at initiation of said concurrent ON state;

whereby after said switching control circuit effects said transition from said No. 1 condition to said concurrent ON state, a current flowing in said first switching element becomes rapidly reduced as a result of said reversal of direction of current flow through said second winding of said first transformer and second winding of said second transformer.

18. A method of controlling a DC-to-DC converter according to claim 17, wherein after transition has been performed from said No. 1 condition to said concurrent ON state, said switching control circuit performs switch-off of said first switching element to effect transition to said No. 2 condition at a time point when a level of current flowing in said first switching element has become substantially equal to zero.

19. A method of controlling a DC-to-DC converter according to claim 17, wherein after transition has been performed from said No. 1 condition to said concurrent ON state, said switching control circuit performs switch-off of said first switching element, to effect transition to said No. 2 condition, at a time point when a level of current flowing in said first switching element has become substantially equal to zero or when a direction of said current has become reversed.

20. A method of controlling a DC-to-DC converter according to claim 17, wherein said first switching element is connected in parallel with a diode, and wherein after transition from said No. 1 condition to said concurrent ON state has been performed, said switching control circuit performs switch-off of said first switching element, to establish said No. 2 condition, at a time point when a level of current flowing in said first switching element has become substantially equal to zero or when a direction of flow of said current has become reversed.

21. A method of controlling a DC-to-DC converter according to claim 20, wherein said first switching element comprises a semiconductor device, and wherein said diode is a parasitic diode that is intrinsic to said semiconductor device.

22. A method of controlling a DC-to-DC converter according to claim 1, wherein
said electric power conversion means comprises a first transformer having a first winding connected in series with said first switching element and having a second winding and a third winding that are respectively connected to said second voltage system circuit, and a second transformer having a first winding connected in series with said second switching element and having a second winding and a third winding that are respectively connected to said second voltage system circuit, with said second winding of said first transformer and second winding of said second transformer being connected in series and with said third winding of said first transformer and said third winding of said second transformer being connected in series,
said first voltage system circuit is configured with a closed circuit formed by said series-connected first winding of said first transformer and said first switching element and said series-connected first winding of said second transformer and said second switching element,
said second voltage system circuit comprises an active clamp circuit that is formed of a fourth switching element and a capacitor connected in series and is connected in parallel with one of said third switching element, said series-connected second winding of said first transformer and second winding of said second transformer, and said series-connected third winding of said first transformer and third winding of said second transformer, said second voltage system circuit further comprising a closed circuit which is formed by said third winding of said first transformer and third winding of said second transformer, said third switching element and a second capacitor, and current supply means connected to said series-connected second winding of said first transformer and second winding of said second transformer,
wherein, when electrical power conversion is being performed from said first voltage system circuit to said second voltage system circuit, and transition is performed from said No. 1 condition to said concurrent ON state, said current supply means supplies a current to said second winding of said first transformer and second winding of said second transformer, with said current flowing in the reverse direction to current that is flowing in said series-connected second winding of said first transformer and second winding of said second transformer, and with said reverse-direction current being supplied prior to switch-on of said second switching element at initiation of said concurrent ON state;
whereby when said switching control circuit effects said transition from said No. 1 condition to said concurrent ON state, a level of current flowing in said first switching element becomes rapidly reduced as a result of supplying said reverse-direction current through said second winding of said first transformer and second winding of said second transformer.

23. A method of controlling a DC-to-DC converter according to claim 22, wherein after transition has been performed from said No. 1 condition to said concurrent ON state, said switching control circuit performs switch-off of said first switching element to effect transition to said No. 2 condition at a time point when a level of current flowing in said first switching element has become substantially equal to zero.

24. A method of controlling a DC-to-DC converter according to claim 22, wherein after transition has been performed from said No. 1 condition to said concurrent ON state, said switching control circuit performs switch-off of said first switching element, to effect transition to said No. 2 condition, at a time point when a level of current flowing in said first switching element has become substantially equal to zero or when a direction of said current has become reversed.

25. A method of controlling a DC-to-DC converter according to claim 22, wherein said first switching element is connected in parallel with a diode, and wherein after transition from said No. 1 condition to said concurrent ON state has been performed, said switching control circuit performs switch-off of said first switching element, to establish said No. 2 condition, at a time point when a level of current flowing in said first switching element has become substantially equal to zero or when a direction of flow of said current has become reversed.

26. A method of controlling a DC-to-DC converter according to claim 25, wherein said first switching element comprises a semiconductor device, and wherein said diode is a parasitic diode that is intrinsic to said semiconductor device.

27. A method of controlling a DC-to-DC converter by operation of a switching control circuit, said DC-to-DC converter comprising
a first voltage system circuit comprising a first switching element and a second switching element,
a second voltage system circuit comprising a third switching element and a fourth switching element,
electric power conversion means for performing electrical power conversion between said first voltage system circuit and said second voltage system circuit, and
said switching control circuit, adapted to perform complementary on/off switching of said first switching element and said second switching element, and to perform complementary on/off switching of said third switching element and said fourth switching element, synchronized with said switching of said first and third switching elements, wherein designating a condition in which both of said first and third switching elements are in an ON state and said second and fourth switching elements are in an OFF state as a No. 1 condition, and designating a condition in which both of said first and third switching elements are in the OFF state and said second and fourth switching elements are in the ON state as a No. 2 condition, said method comprises:

while said electrical power conversion is being performed from said first voltage system circuit to said second voltage system circuit via said electric power conversion means, cyclically performing a sequence of operations whereby following each occasion when said No. 2 condition is established, said first switching element is switched to the ON state to thereby establish a concurrent ON state in which each of said first switching element, second switching element and fourth switching element are in the ON state, with said switch-on of said first switching element being performed prior to performing switch-off of each of said second switching element and of said fourth switching element to establish said No. 1 condition.

28. A method of controlling a DC-to-DC converter according to claim 27, wherein after transition has been performed from said No. 2 condition to said concurrent ON state, said switching control circuit subsequently performs switch-off of said second switching element, to effect transition to said No. 1 condition, at a time point when a level of current flowing in said second switching element has become substantially equal to zero.

29. A method of controlling a DC-to-DC converter according to claim 27, wherein after transition has been performed from said No. 2 condition to said concurrent ON state, said switching control circuit performs switch-off of said second switching element, to effect transition to said No. 1 condition, at a time point when a level of current flowing in said second switching element has become substantially equal to zero or when a direction of said current has become reversed.

30. A method of controlling a DC-to-DC converter according to claim 27, wherein said second switching element is connected in parallel with a diode, and wherein after transition from said No. 2 condition to said concurrent ON state has been performed, said switching control circuit performs switch-off of said second switching element, to establish said No. 1 condition, at a time point when a level of current flowing in said second switching element has become substantially equal to zero or when a direction of flow of said current has become reversed.

31. A method of controlling a DC-to-DC converter according to claim 30, wherein said second switching element comprises a semiconductor device, and wherein said diode is a parasitic diode that is intrinsic to said semiconductor device.

32. A method of controlling a DC-to-DC converter according to claim 27, wherein said electric power conversion means comprises a transformer having a first winding that is connected to said first voltage system circuit and a second winding that is connected to said second voltage system circuit, said first voltage system circuit is configured to apply a short-circuit across said first winding under a condition in which both of said first switching element and said second switching element are concurrently in the ON state, said second voltage system circuit comprises an active clamp circuit formed of a fourth switching element and a first capacitor connected in series, with said active clamp circuit being connected in parallel with one of said second winding and said third switching element, wherein, when electrical power conversion is being performed from said first voltage system circuit to said second voltage system circuit, each time that transition is performed from said No. 2 condition to said concurrent ON state, said first capacitor supplies a current to said second winding, thereby increasing a level of current flowing in said second winding and accordingly rapidly reducing a level of current flowing in said second switching element.

33. A method of controlling a DC-to-DC converter according to claim 32, wherein after transition has been performed from said No. 2 condition to said concurrent ON state, said switching control circuit performs switch-off of said first switching element, to effect transition to said No. 1, condition at a time point when a level of current flowing in said second switching element has become substantially equal to zero.

34. A method of controlling a DC-to-DC converter according to claim 32, wherein after transition has been performed from said No. 2 condition to said concurrent ON state, said switching control circuit performs switch-off of said second switching element, to effect transition to said No. 1 condition, at a time point when a level of current flowing in said second switching element has become substantially equal to zero or when a direction of said current has become reversed.

35. A method of controlling a DC-to-DC converter according to claim 32, wherein said second switching element is connected in parallel with a diode, and wherein after transition from said No. 2 condition to said concurrent ON state has been performed, said switching control circuit performs switch-off of said first switching element, to establish said No. 1 condition, at a time point when a level of current flowing in said first switching element has become substantially equal to zero or when a direction of flow of said current has become reversed.

36. A method of controlling a DC-to-DC converter according to claim 35, wherein said second switching element comprises a semiconductor device, and wherein said diode is a parasitic diode that is intrinsic to said semiconductor device.

37. A method of controlling a DC-to-DC converter according to claim 27, wherein said electric power conversion means comprises a transformer having a first winding connected to said first voltage system circuit and having a second winding and third winding that are respectively connected to said second voltage system circuit, said first voltage system circuit is configured to apply a short-circuit across said first winding under a condition in which both of said first switching element and said second switching element are concurrently in the ON state, said second voltage system circuit comprises an active clamp circuit formed of a fourth switching element and a first capacitor connected in series, with said active clamp circuit being connected in parallel with one of said second winding, said third winding and said third switching element, and further comprises a closed circuit which is formed by said third winding and said third switching element and a second capacitor, wherein, when electrical power conversion is being performed from said first voltage system circuit to said second voltage system circuit, each time that transition is performed from said No. 2 condition to said concurrent ON state, said first capacitor supplies a current to said second winding to increase the level of current flowing in said second winding and thereby rapidly reduce the level of current flowing in said second switching element.

38. A method of controlling a DC-to-DC converter according to claim 37, wherein after transition has been performed from said No. 2 condition to said concurrent ON state, said switching control circuit performs switch-off of said second switching element to effect transition to said No. 1 condition at a time point when a level of current flowing in said second switching element has become substantially equal to zero.

39. A method of controlling a DC-to-DC converter according to claim 37, wherein after transition has been performed from said No. 2 condition to said concurrent ON state, said switching control circuit performs switch-off of said second switching element, to effect transition to said No. 1 condition, at a time point when a level of current flowing in said second switching element has become substantially equal to zero or when a direction of said current has become reversed.

40. A method of controlling a DC-to-DC converter according to claim 37, wherein said second switching element is connected in parallel with a diode, and wherein after transition from said No. 2 condition to said concurrent ON state has been performed, said switching control circuit performs switch-off of said second switching element, to establish said No. 1 condition, at a time point when a level of current flowing in said second switching element has become substantially equal to zero or when a direction of flow of said current has become reversed.

41. A method of controlling a DC-to-DC converter according to claim 40, wherein said second switching element comprises a semiconductor device, and wherein said diode is a parasitic diode that is intrinsic to said semiconductor device.

42. A method of controlling a DC-to-DC converter according to claim 27, wherein said electric power conversion means comprises a first transformer having a first winding connected in series with said first switching element and a second winding connected to said second voltage system circuit, and a second transformer having a first winding connected in series with said second switching element and a second winding connected to said second voltage system circuit, with said second winding of said first transformer and second winding of said second transformer being connected in series, said first voltage system circuit is configured with a closed circuit formed by said series-connected first winding of said first transformer and first switching element and said series-connected first winding of said second transformer and said second switching element, said second voltage system circuit comprises an active clamp circuit that is formed of a fourth switching element and a capacitor connected in series and is connected in parallel with one of said series-connected second winding of said first transformer and second winding of said second transformer and said third switching element, wherein, when electrical power conversion is being performed from said first voltage system circuit to said second voltage system circuit, each time that transition is performed from said No. 2 condition to said concurrent ON state, said capacitor supplies a current to said second winding of said first transformer and second winding of said second transformer, thereby increasing a level of current flow through said second winding of said first transformer and second winding of said second transformer, thereby rapidly reducing a level of current flowing in said second switching element.

43. A method of controlling a DC-to-DC converter according to claim 42, wherein after transition has been performed from said No. 2 condition to said concurrent ON state, said switching control circuit performs switch-off of said second switching element, to effect transition to said No. 1 condition, at a time point when a level of current flowing in said second switching element has become substantially equal to zero.

44. A method of controlling a DC-to-DC converter according to claim 42, wherein after transition has been performed from said No. 2 condition to said concurrent ON state, said switching control circuit performs switch-off of said second switching element, to effect transition to said No. 1 condition, at a time point when a level of current flowing in said second switching element has become substantially equal to zero or when a direction of said current has become reversed.

45. A method of controlling a DC-to-DC converter according to claim 42, wherein said second switching element is connected in parallel with a diode, and wherein after transition from said No. 2 condition to said concurrent ON state has been performed, said switching control circuit performs switch-off of said second switching element, to establish said No. 1 condition 0, at a time point when a level of current flowing in said second switching element has become substantially equal to zero or when a direction of flow of said current has become reversed.

46. A method of controlling a DC-to-DC converter according to claim 45, wherein said second switching element comprises a semiconductor device, and wherein said diode is a parasitic diode that is intrinsic to said semiconductor device.

47. A method of controlling a DC-to-DC converter according to claim 27, wherein said electric power conversion means comprises a first transformer having a first winding connected in series with said first switching element and having a second winding and a third winding that are respectively connected to said second voltage system circuit, a second transformer having a first winding connected in series with said second switching element, and having a second winding and a third winding respectively connected to said second voltage system circuit, with said second winding of said first transformer and second winding of said second transformer being connected in series and said third winding of said first transformer and said third winding of said second transformer being connected in series, said first voltage system circuit is configured with a closed circuit formed by said series-connected first winding of said first transformer and said first switching element and said series-connected first winding of said second transformer and said second switching element, said second voltage system circuit comprises an active clamp circuit that is formed of a fourth switching element and a first capacitor connected in series and is connected in parallel with one of said third switching element, said series-connected second winding of said first transformer, second winding of said second transformer, and said series-connected third winding of said first transformer and third winding of said second transformer, said second voltage system circuit further comprising a closed circuit which is formed by said third winding of said first transformer and third winding of said second transformer, said third switching element and a second capacitor;

wherein when electrical power conversion is being performed from said first voltage system circuit to said second voltage system circuit, each time that transition is performed from said No. 2 condition to said concurrent ON state, said first capacitor supplies a current to said second winding of said first transformer and second winding of said second transformer, increasing the level of current flowing therein and thereby rapidly reducing the level of current flowing in said second switching element.

48. A method of controlling a DC-to-DC converter according to claim 47, wherein after transition has been performed from said No. 2 condition to said concurrent ON state, said switching control circuit performs switch-off of said second switching element to effect transition to said No. 1 condition at a time point when a level of current flowing in said second switching element has become substantially equal to zero.

49. A method of controlling a DC-to-DC converter according to claim 47, wherein after transition has been performed from said No. 2 condition to said concurrent ON state, said switching control circuit performs switch-off of said second switching element, to effect transition to said No. 1 condition, at a time point when a level of current flowing in said second switching element has become substantially equal to zero or when a direction of said current has become reversed.

50. A method of controlling a DC-to-DC converter according to claim 47, wherein said second switching element is connected in parallel with a diode, and wherein after transition from said No. 2 condition to said concurrent ON state has been performed, said switching control circuit performs switch-off of said second switching element, to establish said No. 1 condition, at a time point when a level of current flowing in said second switching element has become substantially equal to zero or when a direction of flow of said current has become reversed.

51. A method of controlling a DC-to-DC converter according to claim 50, wherein said second switching element comprises a semiconductor device, and wherein said diode is a parasitic diode that is intrinsic to said semiconductor device.

* * * * *